US 9,878,694 B2

(12) United States Patent
Hyodo et al.

(10) Patent No.: US 9,878,694 B2
(45) Date of Patent: Jan. 30, 2018

(54) STROKE SIMULATOR AND BUSH FOR STROKE SIMULATOR

(71) Applicants: HONDA MOTOR CO., LTD., Minato-Ku, Tokyo (JP); NISSIN KOGYO CO., LTD., Ueda-Shi, Nagano (JP)

(72) Inventors: Nobutake Hyodo, Wako (JP); Kazuaki Murayama, Wako (JP); Motoyasu Nakamura, Ueda (JP); Shunsuke Aoki, Ageo (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 266 days.

(21) Appl. No.: 14/388,848

(22) PCT Filed: Mar. 29, 2013

(86) PCT No.: PCT/JP2013/059711
§ 371 (c)(1),
(2) Date: Sep. 29, 2014

(87) PCT Pub. No.: WO2013/147244
PCT Pub. Date: Oct. 3, 2013

(65) Prior Publication Data
US 2015/0091371 A1 Apr. 2, 2015

(30) Foreign Application Priority Data

Mar. 30, 2012 (JP) .................. 2012-083316

(51) Int. Cl.
*B60T 8/40* (2006.01)
*B60T 7/04* (2006.01)
(Continued)

(52) U.S. Cl.
CPC .............. *B60T 8/409* (2013.01); *B60T 7/042* (2013.01); *B60T 8/368* (2013.01); *B60T 8/4081* (2013.01);
(Continued)

(58) Field of Classification Search
CPC ........ B60T 13/10; B60T 8/409; B60T 8/4081; B60T 8/4086
(Continued)

(56) References Cited

U.S. PATENT DOCUMENTS

2004/0181381 A1 9/2004 Matsuhashi
2008/0010985 A1* 1/2008 Miyazaki ................ B60T 7/042
60/565
(Continued)

FOREIGN PATENT DOCUMENTS

CN 101879891 A 11/2010
DE 102010003822 A1 10/2011
(Continued)

OTHER PUBLICATIONS

Extended European Search Report issued for corresponding European Patent Application No. 13 769 486.5 dated Nov. 10, 2015.
(Continued)

*Primary Examiner* — Melanie Torres Williams
(74) *Attorney, Agent, or Firm* — Carrier Blackman & Associates, P.C.; William D. Blackman; Joseph P. Carrier

(57) ABSTRACT

A stroke simulator and a bush for a stroke simulator are configured so that a bush provided to a stroke simulator can be attached without direction management. The stroke simulator generates brake reaction force by a simulator piston that is displaced within a cylinder by hydraulic pressure generated according to the operation of a brake pedal by a driver. A cylindrical rubber bush elastically deformed in an axial direction by pressure from the simulator piston to
(Continued)

generate brake reaction force, the bush characterized in that a first end section on the simulator piston side and a second end section facing the first end section contain the same number, at least two, of concave sections concaved in the axial direction, and the concave section formed in the first end section and the concave section formed in the second end section are formed in different positions in the axial direction.

13 Claims, 8 Drawing Sheets

(51) Int. Cl.
   *B60T 13/66* (2006.01)
   *B60T 15/36* (2006.01)
   *B60T 8/36* (2006.01)
   *B60T 13/68* (2006.01)
   *B60T 11/16* (2006.01)

(52) U.S. Cl.
   CPC ............. *B60T 11/16* (2013.01); *B60T 13/662* (2013.01); *B60T 13/686* (2013.01); *B60T 15/36* (2013.01)

(58) Field of Classification Search
   USPC ...................................................... 303/113.4
   See application file for complete search history.

(56) References Cited

U.S. PATENT DOCUMENTS

| | | | | |
|---|---|---|---|---|
| 2010/0078989 A1* | 4/2010 | Kato | ................... | B60T 8/4081 |
| | | | | 303/113.4 |
| 2011/0248557 A1 | 10/2011 | Overzier et al. | | |

FOREIGN PATENT DOCUMENTS

| | | | | |
|---|---|---|---|---|
| EP | 2548776 A2 * | 1/2013 | ............. | B60T 8/409 |
| JP | 2007-210372 A | 8/2007 | | |
| JP | 2007210611 A | 8/2007 | | |
| JP | 2009-073478 A | 4/2009 | | |
| JP | 2009-227172 A | 10/2009 | | |
| JP | 2010047039 A | 3/2010 | | |
| JP | 2010-264839 A | 11/2010 | | |
| JP | 2012-206711 A | 10/2012 | | |
| WO | WO 2013147243 A1 * | 10/2013 | ............. | B60T 7/042 |

OTHER PUBLICATIONS

Office Action dated Jan. 19, 2016 for corresponding Chinese Patent Application No. 201380017089.6.

* cited by examiner

STROKE SIMULATOR AND BUSH FOR STROKE SIMULATOR

TECHNICAL FIELD

The present invention relates to a stroke simulator which generates brake reaction force to be applied to a brake pedal in an electric brake system, and also relates to a bush for use in a stroke simulator.

BACKGROUND ART

The brake systems (electric brake systems) in which an electric motor is used as a drive source for a booster magnifying the tread force with which a brake pedal is depressed are widely known. Such electric brake systems are provided with a stroke simulator, which simulatively generates the brake reaction force to be applied to the brake pedal depressed by the driver. (See Patent Literature 1.) The stroke simulator is required to impart to the driver operation feelings similar to the operation feelings which the conventional brake pedal operating with the brake fluid imparts to the driver. A brake system disclosed in consideration of the above requirement is configured such that an elastic force (reaction force) generated by elastic deformation of two elastic members having different moduli of elasticity is applied as the brake reaction force to the brake pedal, and the brake system includes a stroke simulator which applies reaction force from each of the two elastic members to the brake pedal in correspondence with the amount of depression of the brake pedal. (See Patent Literature 2.)

Citation List—Patent Literature

Patent Literature 1: Japanese Patent Laid-Open No. 2007-210372
Patent Literature 2: Japanese Patent Laid-Open No. 2009-073478

SUMMARY OF INVENTION

Technical Problem

For example, in the stroke simulator in the brake system disclosed in Patent Literature 2, a first elastic member (the first return spring) and a second elastic member (the second return spring) are connected in series, and the spring constant (modulus of elasticity) of the first elastic member is set smaller than the spring constant (modulus of elasticity) of the second elastic member. While the amount of depression of the brake pedal is small, the reaction force generated by elastic deformation of the first elastic member having the smaller modulus of elasticity is applied as the brake reaction force to the brake pedal. After the amount of the elastic deformation of the first elastic member reaches a predetermined amount, the second elastic member having the greater modulus of elasticity is elastically deformed according to the amount of depression of the brake pedal, so that a reaction force corresponding to the elastic deformation is applied as the brake reaction force to the brake pedal.

According to the above structure, in some cases, the brake reaction force applied to the brake pedal discontinuously changes at a point at which the brake reaction force is switched from the reaction force generated by the first elastic member to the reaction force generated by the second elastic member (and which is hereinafter referred to as a switch point). In such cases, the driver feels a sense of incongruity in the operation feelings of the brake pedal. Therefore, it is desirable that the brake system be provided with a third elastic member capable of generating a reaction force which complements the difference between the reaction force generated by the first elastic member and the reaction force generated by the second elastic member so that the brake reaction force applied to the brake pedal is continuously and smoothly switched from the reaction force generated by the first elastic member to the reaction force generated by the second elastic member.

The third elastic member may be connected in parallel with, for example, the first elastic member, and may be arranged to begin to be elastically deformed immediately before the switch point and apply the elastic force (reaction force) of the third elastic member as the brake reaction force to the brake pedal. According to the above arrangement, from the instance immediately before the switch point, the reaction force generated by the third elastic member is superimposed on the reaction force generated by the first elastic member and applied to the brake pedal, so that the brake reaction force increases. Further, it is desirable that, at the switch point, the reaction force generated by the third elastic member and the reaction force generated by the first elastic member realize a brake reaction force equivalent (or close) to the reaction force generated by the second elastic member, and the brake reaction force be applied to the brake pedal.

Therefore, it is desirable that the reaction force generated by the third elastic member be small in the beginning of elastic deformation, and increase with the amount of the elastic deformation. That is, desirably, the third elastic member is arranged such that the reaction force generated by the third elastic member varies with the amount of depression of the brake pedal. According to the above arrangement, the reaction force applied to the brake pedal does not greatly differ from the reaction force generated by the first elastic member in the beginning of the elastic deformation of the third elastic member. Therefore, the driver can depress the brake pedal with natural operation feelings without awareness of the application of the reaction force generated by the third elastic member. Further, when the reaction force generated by the first elastic member and the third elastic member does not greatly differ from the reaction force generated by the second elastic member at the aforementioned switch point, the driver can depress the brake pedal with natural operation feelings without awareness of the change of the brake reaction force applied to the brake pedal from the reaction force generated by the first elastic member and the third elastic member to the reaction force generated by the second elastic member.

As described above, it is desirable that the third elastic member generate a weak reaction force in the beginning of elastic deformation, and a reaction force having such a strength as to complement the difference between the reaction force generated by the first elastic member and the reaction force generated by the second elastic member. Therefore, it is desirable that the third elastic member be realized by a bush formed of rubber, and the stroke simulator be configured to change the reaction force generated by elastic deformation of the bush which is caused according to the amount of depression of the brake pedal.

An example of the third elastic member which generates a reaction force as above is a bush formed to be elastically deformed and generate a reaction force when being pressed by a piston which causes elastic deformation of the first elastic member. The third elastic member arranged as above is installed so as to be elastically compressed in the direction of displacement of the piston. In some cases, the reaction force generated by the third elastic member varies according to the arrangement of opposite ends of the third elastic member in the direction of displacement of the piston (which are hereinafter referred to as the end A and the end B). For example, in some cases, the reaction force generated by the third elastic member may be different between an arrangement in which the end A is located on the piston side and an arrangement in which the end B is located on the piston side.

In order not to cause a difference in the reaction force according to the difference in the orientation of arrangement as above in each stroke simulator, it is necessary to equalize the orientation of arrangement of the third elastic member in all stroke simulators. For example, the third elastic member is required to be arranged such that the end A in every stroke simulator is located on the piston side. Thus, the orientation of arrangement of the third elastic member is required to be controlled in the operation for installing the third elastic member in the process for manufacturing each stroke simulator, so that the work efficiency is lowered. In addition, since the stroke simulator in which the third elastic member is installed in the opposite orientation becomes a defective product, the defect ratio is increased by the defective installation of the third elastic member.

In view of above, an object of the present invention is to provide a stroke simulator configured to enable installation of a bush in the stroke simulator without controlling the orientation, and another object of the present invention is to provide a bush for use in the stroke simulator.

Solution to Problem

In order to accomplish the above object, according to the present invention, a stroke simulator is provided. The stroke simulator includes a simulator piston which is displaced in a cylinder with a hydraulic pressure generated by a hydraulic-pressure generation means according to a manipulation of a brake manipulator by a driver, and a reaction-force generation means which applies to the simulator piston a reaction force corresponding to displacement of the simulator piston; and the simulator piston generates the reaction force applied to the simulator piston, as a brake reaction force to be applied to the brake manipulator. The stroke simulator is characterized in that the reaction-force generation means includes a bush which has a cylindrical shape and is elastically deformed in an axial direction by being pressed by displacement of the simulator piston; an identical number of recesses or protrusions formed on each of a first end portion and a second end portion of the bush, where the identical number is greater than one, the recesses are depressed and the protrusions protrude in the axial direction, the first end portion is at one end of the bush, and the second end portion is at another end of the bush; and the recesses or protrusions on the first end portion are formed in positions of the bush which are different in the axial direction from positions of the recesses or protrusions on the second end portion.

According to the present invention, the identical number (which is two or more) of recesses or protrusions are formed on each of the first and second end portions of the cylindrical bush (which is elastically deformed in the axial direction by displacement of the simulator piston), and the recesses or protrusions on the first end portion are formed in positions of the bush which are different in the axial direction from positions of the recesses or protrusions on the second end portion. According to this structure, the generated reaction force is not different whichever of the opposite ends of the bush in the axial direction is assumed to be the first end portion (or the second end portion). Therefore, it is possible to install the bush without controlling the orientation in the axial direction in the process for manufacturing the stroke simulator, and prevent lowering of the productivity. In addition, since products are not determined to be defective on the ground that the bush is installed in a wrong orientation, the defect ratio can be lowered.

An additional feature of the stroke simulator according to the present invention is that a hollow having a columnar shape is formed in the bush to penetrate through the bush in the axial direction, and the recesses or protrusions are formed equally spaced out around the hollow on each of the first end portion and the second end portion.

According to the invention described above, the hollow having the columnar shape and penetrating through the bush in the axial direction is formed in the bush, and the recesses or protrusions are formed equally spaced out around the hollow on each of the first end portion and the second end portion. Therefore, the bush can evenly and preferably generate a reaction force.

An additional feature of the stroke simulator according to the present invention is that the recesses or protrusions on each of the first end portion and the second end portion are formed in the number of two, the two recesses or protrusions on the first end portion are formed along a first straight line perpendicular to the axial direction, the two recesses or protrusions on the second end portion are formed along a second straight line perpendicular to the axial direction and the first straight line.

According to the invention described above, the two recesses or protrusions on the first end portion are formed along the first straight line, and the two recesses or protrusions on the second end portion are formed along the second straight line perpendicular to the first straight line. That is, the two recesses or protrusions on the first end portion can be arranged in the positions shifted by 90 degrees in the circumferential direction from the positions of the two recesses or protrusions on the second end portion. In other words, the recesses or protrusions on the first end portion can be arranged in the positions different in the circumferential direction from the positions of the recesses or protrusions on the second end portion. Therefore, it is possible to generate the reaction force evenly in the first and second end portions while suppressing variations of the modulus of elasticity and maintaining the rigidity.

An additional feature of the stroke simulator according to the present invention is that a rod member which extends from the simulator piston toward the bush and guides elastic deformation of the bush in the axial direction is arranged through a rod insertion bore formed in the bush, and a portion, inserted from the simulator piston into the bush, of an outer circumference of the rod member which is in contact with an inner circumference of the rod insertion bore is even in the axial direction.

According to the invention described above, the rod member inserted through the rod insertion bore in the bush is arranged to extend from the simulator piston toward the bush, and the bush is elastically deformed while being guided by the rod member. Then, the portion, inserted from the simulator piston into the bush, of the outer circumference of the rod member is formed to be even in the axial direction. Therefore, the direction in which the rod member is inserted through the bush is not limited by the axial direction of the bush. Thus, in the process for manufacturing the stroke simulator, the rod member can be inserted through the bush without controlling the orientation of the bush in the axial direction.

In addition, according to the present invention, a bush for a stroke simulator is provided. The bush is provided in a stroke simulator generating, as a brake reaction force to be applied to a brake manipulator, a reaction force applied to a simulator piston which is displaced in a cylinder with a hydraulic pressure generated by a hydraulic-pressure generation means according to a manipulation of the brake manipulator by a driver, and arranged in a reaction-force generation means which applies to the simulator piston a reaction force corresponding to displacement of the simulator piston. The bush for a stroke simulator is characterized in that: the bush has a cylindrical shape to be elastically deformed in an axial direction by being pressed by displacement of the simulator piston; and the bush includes an identical number of recesses or protrusions formed on each of a first end portion and a second end portion of the bush, where the identical number is greater than one, the recesses are depressed and the protrusions protrude in the axial direction, the first end portion is at one end of the bush, the second end portion is at another end of the bush, and the recesses or protrusions on the first end portion are formed in positions of the bush which are different in the axial direction from positions of the recesses or protrusions on the second end portion.

According to the invention described above, in the bush (for the stroke simulator) which has a cylindrical shape and is elastically deformed in the axial direction by displacement of the simulator piston, the identical number (which is two or more) of recesses or protrusions are formed on each of the first and second end portions, and the recesses or protrusions on the first end portion are formed in positions of the bush which are different in the axial direction from positions of the recesses or protrusions on the second end portion. According to this structure, the generated reaction force is not different whichever of the opposite ends of the bush in the axial direction is assumed to be the first end portion (or the second end portion). Therefore, in the process for manufacturing the stroke simulator, the bush can be installed without managing the orientation of the bush in the axial direction, so that it is possible to prevent lowering of the productivity. In addition, since products are not determined to be defective on the ground that the bush is installed in a wrong orientation, the defect ratio can be lowered.

An additional feature of the bush for a stroke simulator according to the present invention is that a hollow having a columnar shape is formed in the bush to penetrate through the bush in the axial direction, and the recesses or protrusions are formed equally spaced out around the hollow on each of the first end portion and the second end portion.

In the bush according to the invention described above, the hollow having the columnar shape and penetrating through the bush in the axial direction is formed, and the recesses or protrusions are formed equally spaced out around the hollow on each of the first end portion and the second end portion. Therefore, the reaction-force generation means having this bush can evenly and preferably generate a reaction force.

An additional feature of the bush for a stroke simulator according to the present invention is that the recesses or protrusions on each of the first end portion and the second end portion are formed in the number of two, the two recesses or protrusions on the first end portion are formed along a first straight line perpendicular to the axial direction, the two recesses or protrusions on the second end portion are formed along a second straight line perpendicular to the axial direction and the first straight line.

In the bush according to the invention described above, the two recesses or protrusions on the first end portion are formed along the first straight line, and the two recesses or protrusions on the second end portion are formed along the second straight line perpendicular to the first straight line. That is, the two recesses or protrusions on the first end portion can be arranged in the positions shifted by 90 degrees in the circumferential direction from the positions of the two recesses or protrusions on the second end portion. In other words, the recesses or protrusions on the first end portion can be arranged in the positions different in the circumferential direction from the positions of the recesses or protrusions on the second end portion. Therefore, the bush according to the invention described above can generate the reaction force evenly in the first and second end portions while suppressing variations of the modulus of elasticity and maintaining the rigidity.

Effect of Invention

According to the present invention, it is possible to provide a stroke simulator configured to enable installation of a bush in the stroke simulator without controlling the orientation, and also provide a bush for the stroke simulator.

DESCRIPTION OF EMBODIMENTS

Figure 1:
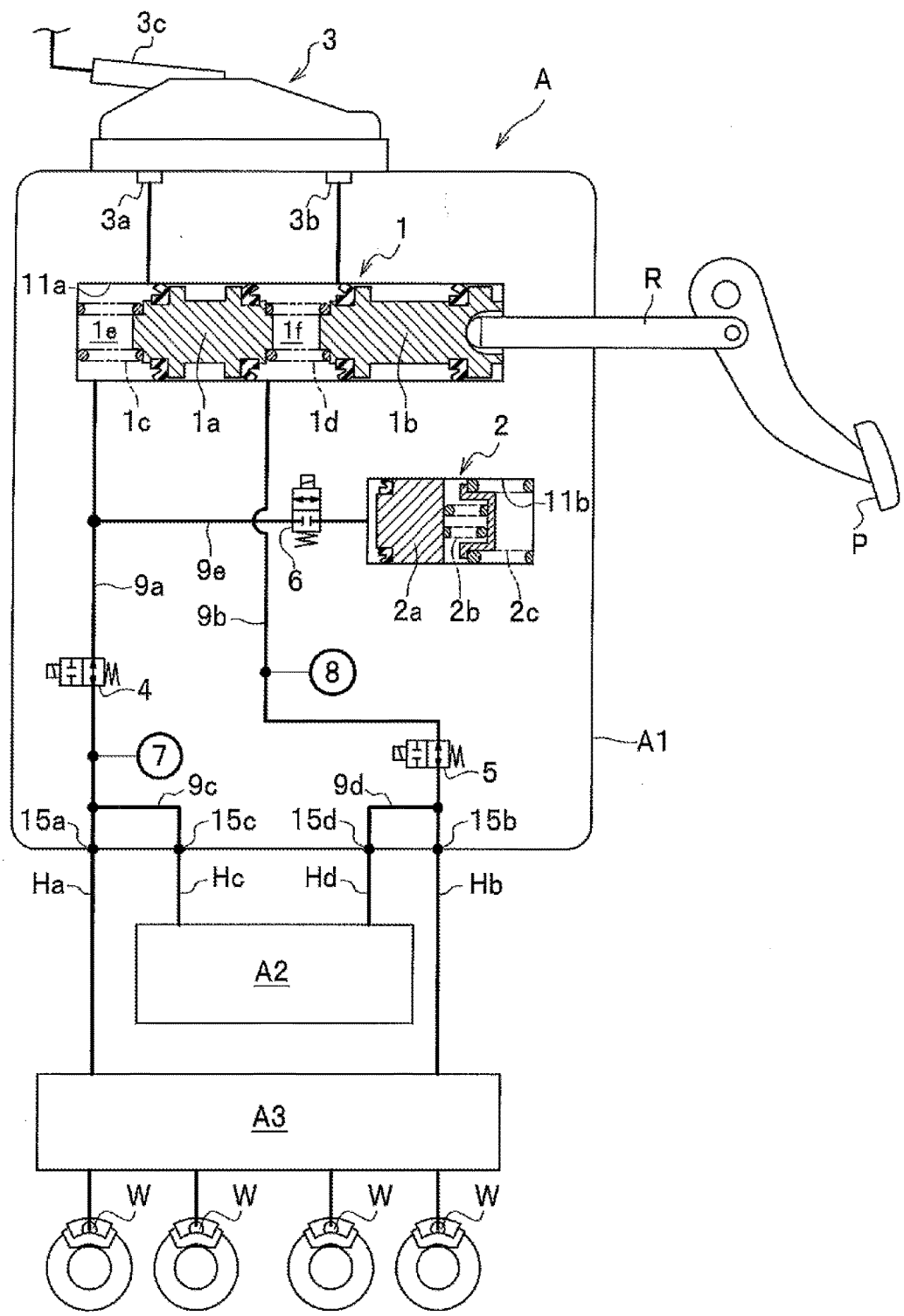
FIG. 1 is a schematic construction diagram of a vehicle brake system including a stroke simulator according to an embodiment of the present invention.

Hereinbelow, an embodiment of the present invention is explained in detail with reference to accompanying drawings when necessary. FIG. 1 is a schematic construction diagram of a vehicle brake system including a stroke simulator according to an embodiment of the present invention.

The vehicle brake system A illustrated in FIG. 1 includes both of a by-wire brake system which operates when a prime mover (an engine, an electric motor, or the like) is in operation and a hydraulic brake system which operates at times of emergency or stop of the prime mover. The vehicle brake system A includes a master cylinder device A1, a motor cylinder device A2, and a vehicle stability assist device A3. The master cylinder device A1 generates a hydraulic brake pressure according to the tread force with which the brake pedal P (as a brake manipulator) is depressed, the motor cylinder device A2 generates a hydraulic brake pressure by use of an electric motor (not shown), and the hydraulic control device A3 assists in stabilization of the vehicle behavior. (Hereinafter, the vehicle stability assist device A3 is referred to as the hydraulic control device A3.) The master cylinder device A1, the motor cylinder device A2, and the hydraulic control device A3 are respectively configured in the forms of separate units, and are connected through external piping.

The vehicle brake system A can be mounted on vehicles including the automobiles powered by only an engine (internal-combustion engine), hybrid electric vehicles using electric motors as well as an engine, electric vehicles, fuel-cell vehicles, and the like which use only electric motors as power sources.

The master cylinder device (input device) A1 includes a tandem-type master cylinder 1, a stroke simulator 2, a reservoir 3, normally-open shutoff valves (solenoid valves) 4 and 5, a normally-closed shutoff valve (solenoid valve) 6, pressure sensors 7 and 8, main hydraulic paths 9a and 9b, hydraulic communication paths 9c and 9d, and a hydraulic branch path 9e.

The master cylinder 1 is a hydraulic-pressure generating means which generates a hydraulic pressure by converting the tread force with which the brake pedal P is depressed, into the hydraulic brake pressure. The master cylinder 1 includes a first piston 1a, a second piston 1b, a first return spring 1c, and a second return spring 1d. The first piston 1a is arranged on the bottom wall side of a first cylinder bore 11a, the second piston 1b is connected to a push rod R, the first return spring 1c is arranged between the first piston 1a and the bottom wall of the first cylinder bore 11a, and the second return spring 1d is arranged between the pistons 1a and 1b. The second piston 1b is connected through the push rod R to the brake pedal P. The pistons 1a and 1b slide (to be displaced) in response to the tread force from the brake pedal P, and pressurize the brake fluid in pressure chambers 1e and 1f. The pressure chambers 1e and 1f communicate with the main hydraulic paths 9a and 9b.

The stroke simulator 2 is a device which generates a simulated reaction force (brake reaction force) in response to a manipulation and applies the simulated reaction force to the brake pedal P. The stroke simulator 2 includes a simulator piston 2a and large and small return springs (a first return spring 2b and a second return spring 2c). The simulator piston 2a slides to be displaced in a second cylinder bore 11b. The return springs 2b and 2c bias the simulator piston 2a. The stroke simulator 2 communicates with the pressure chamber 1e through the main hydraulic path 9a and the hydraulic branch path 9e, so that the hydraulic brake pressure generated in the pressure chamber 1e actuates the stroke simulator 2. The stroke simulator 2 will be explained in detail later.

The reservoir 3 is a container, which reserves the brake fluid. The reservoir 3 includes oil feeding ports 3a and 3b connected to the master cylinder 1, and a tube connection port 3c to which a hose extended from a main reservoir (not shown) is connected.

The normally-open shutoff valves 4 and 5 open and close the main hydraulic paths 9a and 9b, and are realized by normally-open solenoid valves. The normally-open shutoff valve 4 opens and closes the main hydraulic path 9a in the section from the intersection point of the main hydraulic path 9a and the hydraulic branch path 9e to the intersection point of the main hydraulic path 9a and the hydraulic communication path 9c. The normally-open shutoff valve 5 opens and closes the main hydraulic path 9b on the upstream side of the intersection point of the main hydraulic path 9b and the hydraulic communication path 9d.

The normally-closed shutoff valve 6 opens and closes the hydraulic branch path 9e, and is realized by a normally-closed solenoid valve.

The pressure sensors 7 and 8 detect the magnitude of the hydraulic brake pressure, and are fitted to sensor installation bores (not shown) which communicate with the main hydraulic paths 9a and 9b. The pressure sensor 7 is arranged on the downstream side of the normally-open shutoff valve 4, and detects the hydraulic brake pressure generated in the motor cylinder device A2 when the normally-open shutoff valve 4 is in a closed state (i.e., in the state in which the main hydraulic path 9a is shut off). The pressure sensor 8 is arranged on the upstream side of the normally-open shutoff valve 5, and detects the hydraulic brake pressure generated in the master cylinder 1 when the normally-open shutoff valve 5 is in a closed state (i.e., in the state in which the main hydraulic path 9b is shut off).

The information acquired by the pressure sensors 7 and 8 is outputted to an electronic control unit (ECU), which is not shown.

The main hydraulic paths 9a and 9b are hydraulic paths originated from the master cylinder 1. Tubes Ha and Hb extending to the hydraulic control device A3 are connected to output ports 15a and 15b, at which the main hydraulic paths 9a and 9b terminate.

The hydraulic communication paths 9c and 9d are hydraulic paths extending from input ports 15c and 15d to the main hydraulic paths 9a and 9b. Tubes Hc and Hd extending to the motor cylinder device A2 are connected to the input ports 15c and 15d.

The hydraulic branch path 9e is a hydraulic path which branches off from the main hydraulic path 9a, and extends to the stroke simulator 2.

The master cylinder device A1 communicates with the hydraulic control device A3 through the tubes Ha and Hb. The hydraulic brake pressure generated in the master cylinder 1 when the normally-open shutoff valves 4 and 5 are in an open state is inputted to the hydraulic control device A3 through the main hydraulic paths 9a and 9b and the tubes Ha and Hb.

Although not shown, the motor cylinder device A2 includes slave pistons, an actuator mechanism, and a reservoir. The slave pistons slide in the slave cylinder. The actuator mechanism includes an electric motor and a driving-force transmission portion. The above reservoir reserves the brake fluid in the slave cylinder. The electric motor operates on the basis of a signal from the electronic control unit (not shown). The driving-force transmission portion converts the rotational power of the electric motor into a forward or backward motion, and transmits the forward or backward motion to the slave pistons. When the slave pistons receive the driving force of the electric motor, the slave pistons slide to be displaced in the slave cylinder and pressurize the brake fluid in the slave cylinder. The hydraulic brake pressure generated in the motor cylinder device A2 is inputted into the master cylinder device A1 through the tubes Hc and Hd, and is further inputted into the hydraulic control device A3 through the hydraulic communication paths 9c and 9d and the tubes Ha and Hb. A hose extended from the main reservoir (not shown) is connected to the above reservoir.

The hydraulic control device A3 has such a structure that antilock brake control (ABS control) for suppressing wheel slips, sideslip control and traction control for stabilizing the vehicle behavior, and the like can be performed. The hydraulic control device A3 is connected to the wheel cylinders W through tubes. Although not shown, the hydraulic control device A3 includes a hydraulic unit, electric motors, an electronic control unit (not shown), and the like, where solenoid valves, pumps, and the like are arranged in the hydraulic unit, the electric motors drive the pumps, and the electronic control unit controls the solenoid valves, the motors, and the like.

Next, operations of the vehicle brake system A are briefly explained below. In the normal state, in which the vehicle brake system A normally operates, the normally-open shutoff valves 4 and 5 are closed, and the normally-closed shutoff valve 6 is open. When the brake pedal P is manipulated in the above state, the hydraulic brake pressure generated in the master cylinder 1 is not transmitted to the wheel cylinders W, and is instead transmitted to the stroke simulator 2, so that the simulator piston 2a is displaced. Therefore, depression of the brake pedal P is allowed by displacement of the simulator piston 2a, and the reaction force applied to the simulator piston 2a from the elastic members elastically deformed by the displacement of the simulator piston 2a is generated as a simulated brake reaction force, and applied to the brake pedal P.

In addition, when depressing of the brake pedal P is detected by a stroke sensor (not shown) or the like, the electric motor in the motor cylinder device A2 is driven, and the slave pistons are displaced, so that the brake fluid in both of the pressure chambers is pressurized.

The electronic control unit (not shown) compares the hydraulic brake pressure outputted from the motor cylinder device A2 (the hydraulic brake pressure detected by the pressure sensor 7) with the hydraulic brake pressure outputted from the master cylinder 1 (the hydraulic brake pressure detected by the pressure sensor 8), and controls the number of rotations and the like of the electric motor on the basis of the comparison result.

The hydraulic brake pressure generated in the motor cylinder device A2 is transmitted to the wheel cylinders W through the hydraulic control device A3, and the wheel cylinders W are actuated, so that braking forces are exerted on the respective wheels.

Further, in the situation in which the motor cylinder device A2 does not operate (e.g., in cases of emergency or loss of electric power), both of the normally-open shutoff valves 4 and 5 are brought into the open state, so that the hydraulic brake pressure generated in the master cylinder 1 is transmitted to the wheel cylinders W.

Next, a concrete construction of the master cylinder device A1 is explained below.

Figure 2A:
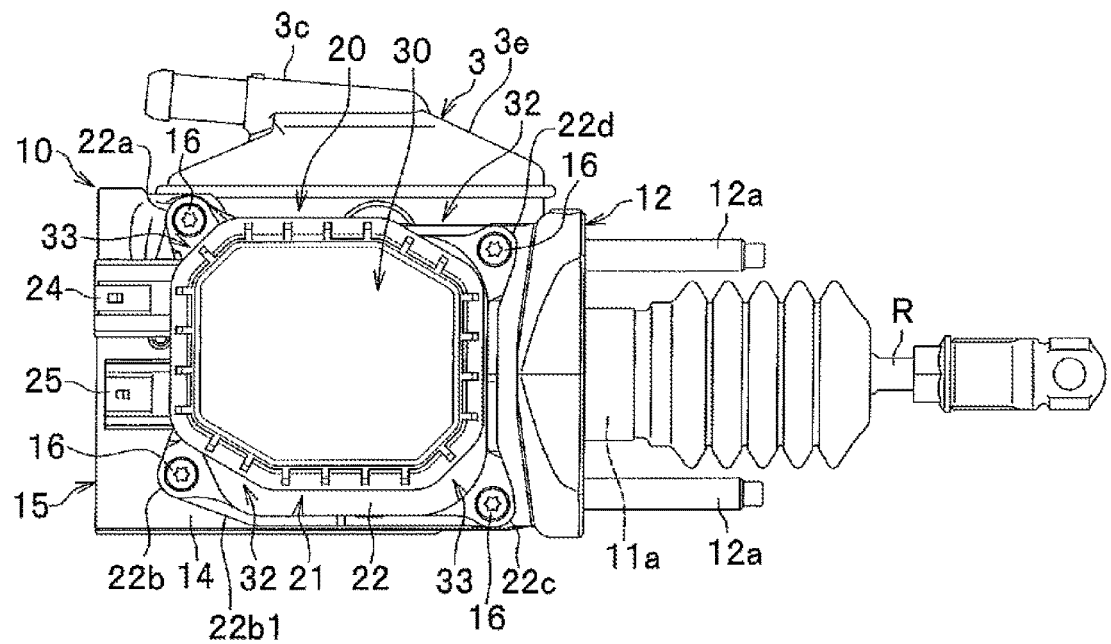
FIG. 2A is a side view of the master cylinder device.
Figure 2B:
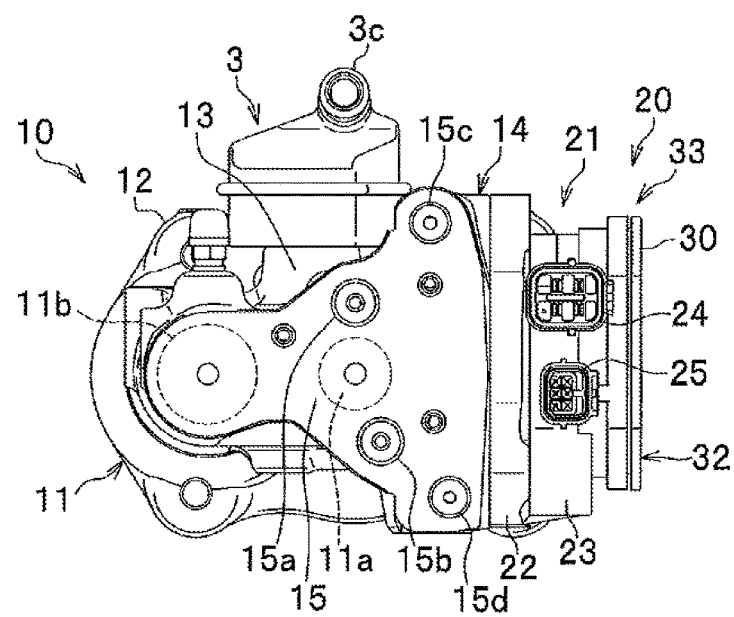
FIG. 2B is a front view of the master cylinder device.

The master cylinder device A1 according to the present embodiment is formed by installing various parts mentioned before inside or outside the base body 10 illustrated in FIGS. 2A and 2B, and covering, with a housing 20, the electrically operating components (the normally-open shutoff valves 4 and 5, the normally-closed shutoff valve 6, and the pressure sensors 7 and 8 illustrated in FIG. 1). In addition, mechanical components and the like may also be contained in the housing 20.

The base body 10 is a casting of an aluminum alloy, and includes a cylinder portion 11, a chassis fixing portion 12, reservoir mounting portions 13, a housing fixing portion 14, and a piping connection portion 15. (Hereinafter, see FIG. 2B for the cylinder portion 11 and the reservoir mounting portions 13.) In addition, bores (not shown) realizing the main hydraulic paths 9a and 9b and the hydraulic branch path 9e, and the like are formed inside the base body 10.

The first cylinder bore 11a for the master cylinder and the second cylinder bore 11b for the stroke simulator (which are illustrated by dashed lines in FIG. 2B) are formed in the cylinder portion 11. The cylinder bores 11a and 11b have the shape of a bottomed cylinder, are open to the chassis fixing portion 12, and are elongated toward the piping connection portion 15. The components constituting the master cylinder 1 as illustrated in FIG. 1 (i.e., the first piston 1a, the second piston 1b, the first return spring 1c, and the second return spring 1d) are inserted in the first cylinder bore 11a, and the components constituting the stroke simulator 2 (i.e., the simulator piston 2a and the first and second return springs 2b and 2c) are inserted in the second cylinder bore 11b.

The chassis fixing portion 12 is fixed to a chassis-side fixing position, which is, for example, the toe board (not shown). The chassis fixing portion 12 is formed on the rear side of the base body 10, and has a flange-like shape. Bolt insertion bores (not shown) are formed in a peripheral portion of the chassis fixing portion 12 for fixing with bolts 12a. (The peripheral portion is a portion which extends outward from the cylinder portion 11.)

As illustrated in FIG. 2B, the reservoir mounting portions 13 are portions arranged as mounting sheets for the reservoir 3, and specifically two reservoir mounting portions are formed on the upper surface of the base body 10 (although only one of the reservoir mounting portions is illustrated). Reservoir union ports are arranged in the reservoir mounting portions 13. In addition, the reservoir 3 is fixed to the base body 10 through a connection portion (not shown), which is formed on the upper surface of the base body 10 to protrude from the upper surface.

Each of the reservoir union ports has a cylindrical shape, and communicates with the first cylinder bore 11a through a bore extending from the bottom surface of the reservoir union port toward the first cylinder bore 11a. Liquid feeding ports (not shown) which are arranged to protrude from the lower portion of the reservoir 3 are connected to the reservoir union ports, and the container body of the reservoir 3 is placed on the tops of the reservoir union ports.

The housing fixing portion 14 is arranged on a side surface of the base body 10. The housing fixing portion 14 is a portion arranged as a mounting seat for the housing 20. The housing fixing portion 14 has a flange-like shape. Female screws (not shown) are formed in the upper end portion and the lower end portion of the housing fixing portion 14 such that the housing 20 can be fixed to the housing fixing portion 14 (on the side surface of the base body 10) by screw engagement of mounting screws 16 with the female screws as illustrated in FIG. 2A.

Although not shown, three valve mounting bores and the two sensor installation bores are formed in the housing fixing portion 14. The normally-open shutoff valves 4 and 5 and the normally-closed shutoff valve 6 (which are illustrated in FIG. 1) are installed in the three valve mounting bores, and the pressure sensors 7 and 8 (which are illustrated in FIG. 1) are installed in the two sensor installation bores.

The piping connection portion 15 is a portion arranged as a tube mounting seat, and formed in the front portion of the base body 10 as illustrated in FIG. 2A. Two output ports 15a and 15b and two input ports 15c and 15d are formed in the piping connection portion 15 as illustrated in FIG. 2B of FIGS. 2A and 2B. The tubes Ha and Hb extending to the hydraulic control device A3 are connected to the output ports 15a and 15b, and the tubes Hc and Hd extending to the motor cylinder device A2 are connected to the input ports 15c and 15d (as illustrated in FIG. 1).

Figure 3:
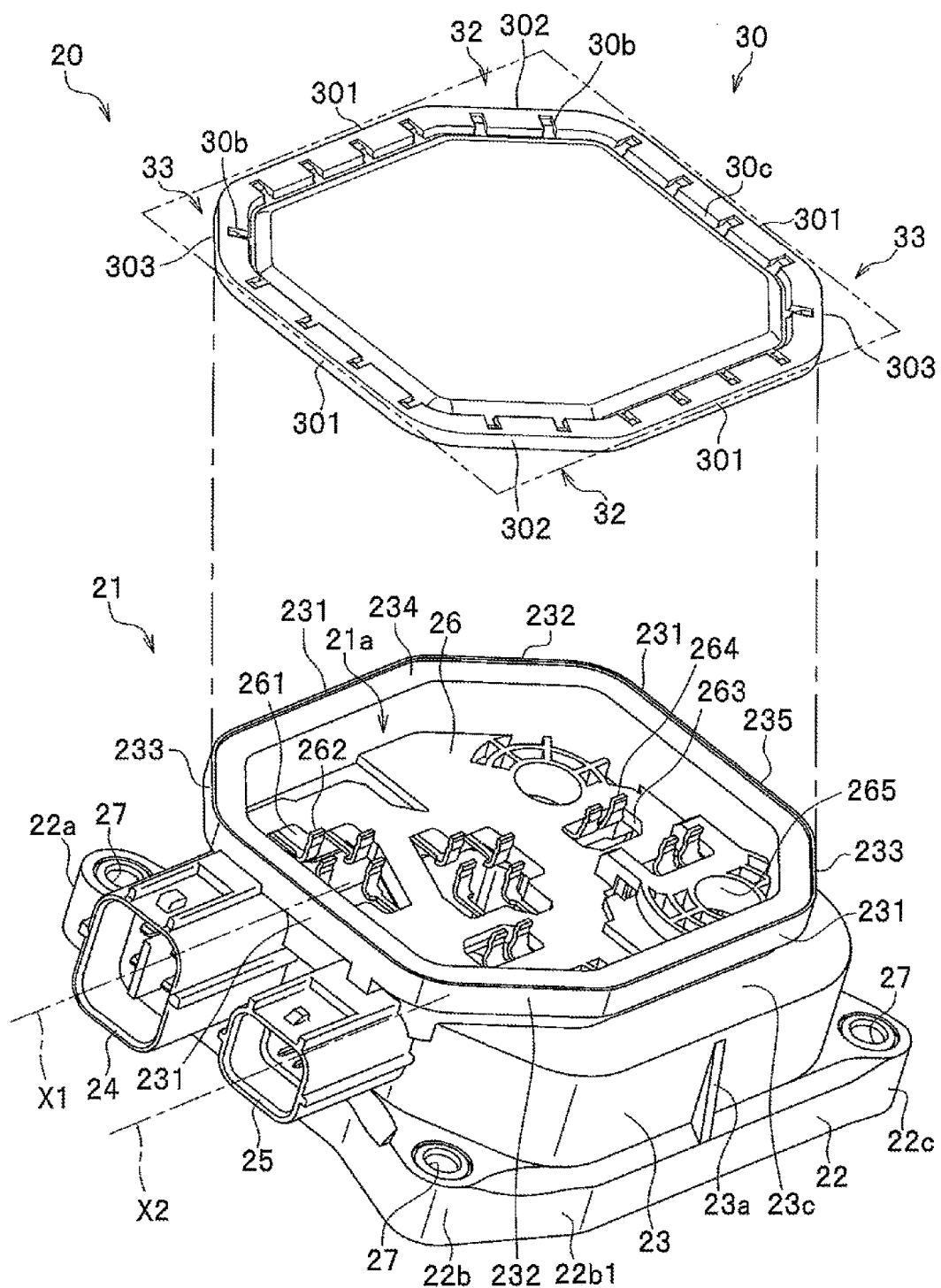
FIG. 3 is an exploded perspective view of a housing.

The housing 20 includes a housing body 21 and a lid member 30. The housing body 21 liquid tightly covers the components installed in the housing fixing portion 14 (i.e., the normally-open shutoff valves 4 and 5, the normally-closed shutoff valve 6, and the pressure sensors 7 and 8 as illustrated in FIG. 1). The lid member 30 is attached to an opening of the housing body 21. As illustrated in FIG. 3, the housing body 21 includes a flange portion 22, a peripheral wall portion 23, and two connectors 24 and 25. The peripheral wall portion 23 is arranged to stand on the flange portion 22, and the two connectors 24 and 25 are connector portions arranged to protrude from a peripheral wall surface of the peripheral wall portion 23.

Although not shown, solenoid coils for actuating the normally-open shutoff valves 4 and 5 and the normally-closed shutoff valve 6, bus-bars extending to the solenoid coils and the pressure sensors 7 and 8, and other components are contained inside the peripheral wall portion 23 of the housing body 21. The flange portion 22 is a portion which is attached and pressed to the housing fixing portion 14. (Hereinafter, see FIG. 2B for the housing fixing portion 14.) The flange portion 22 is formed to externally extend from the housing body 21 and continuously extend to boss portions 22a to 22d as mounting screw portions.

The boss portions 22a to 22d are arranged at four corners of the housing body 21, respectively, in correspondence with the positions of the female screws in the housing fixing portion 14. Metallic collars are embedded in the respective boss portions 22a to 22d, and screw insertion bores 27 (screw bores) functioning as insertion bores are formed inside the metallic collars. In addition, the mounting screws 16 (as illustrated in FIG. 2A) as fastening members are respectively inserted in the screw insertion bores 27. The housing 20 can be firmly fixed to the housing fixing portion 14 of the base body 10 (illustrated in FIG. 2A) by evenly fastening the mounting screws 16.

As illustrated in FIG. 3, a flange portion 22b1 continuously extending to the boss portion 22b has an inclined lower surface. The inclination of the flange portion 22b1 corresponds to the inclination of a first inclined edge portion 232 in the peripheral wall portion 23. Thus, the space is saved. (The first inclined edge portion 232 is explained later.)

In addition, a circumferential groove (not shown) is formed on a surface, opposed to the housing fixing portion 14, of the flange portion 22, and a sealing member formed of a synthetic rubber is fitted into the circumferential groove. Fastening with the mounting screws 16 causes the sealing member to adhere to the housing fixing portion 14 and play a roll of maintaining the liquid tightness of the housing body 21.

Ribs 23a are arranged at appropriate positions on the outer circumferential surface of the peripheral wall portion 23. The ribs 23a are formed to extend from the peripheral wall portion 23 to the flange portion 22 as illustrated in FIG. 3.

A partition wall 26 is formed inside the peripheral wall portion 23 as illustrated in FIG. 3. In the partition wall 26, sensor connection bores 261, coil connection bores 263, and solenoid-valve insertion bores 265 are formed to be opened. The pressure sensors 7 and 8 (illustrated in FIG. 1) are connected to the sensor connection bores 261. The solenoid-valve insertion bores 265 are insertion bores for the normally-open shutoff valves 4 and 5 and the normally-closed shutoff valve 6. In addition, terminals 262 and 264 are arranged in the sensor connection bores 261 and the coil connection bores 263.

As illustrated in FIG. 3, the lid member 30 is attached to an opening edge 234 of the peripheral wall portion 23. The lid member 30 is fixed to the opening edge 234 by an adhesion means such as an adhesive or ultrasonic welding. The opening edge 234 has a shape corresponding to the profile of the lid member 30.

As illustrated in FIG. 3, the lid member 30 has an octagonal profile, and is formed to be point symmetric with respect to a center corresponding to the center of an opening 21a of the peripheral wall portion 23.

The lid member 30 has a profile inscribed in a quadrangle formed with two sets of opposed sides (the rectangle illustrated by the two-dot chain line). The lid member 30 has a pair of first lacking portions 32 and a pair of second lacking portions 33. The pair of first lacking portions 32 are formed by absence of portions equal in size at a pair of opposite angles of the quadrangle, and the pair of second lacking portions 33 are formed by absence of portions equal in size at the other pair of opposite angles of the quadrangle. Each of the first and second lacking portions 32 and 33 has a triangular shape.

The lid member 30 includes linear edges 301, first slant edges 302, and second slant edges 303. The linear edges 301 run along the sides of the quadrangle. The first slant edges 302 face the first lacking portions 32, and the second slant edges 303 face the second lacking portions 33.

The number of the linear edges 301 is four in correspondence with the four sides of the quadrangle, and the lengths of the linear edges 301 are identical. The opposed ones of the linear edges 301 are parallel. The first slant edges 302 connect adjacent ones of the linear edges 301, and parallel to each other. The second slant edges 303 connect adjacent ones of the linear edges 301, and parallel to each other.

The (absent) areas of the first lacking portions 32 are greater than the (absent) areas of the second lacking portions 33. As illustrated in FIG. 2A, on one side of the base body 10, one of the first lacking portions 32 is located in a lower front portion of the base body 10, and the other of the first lacking portions 32 is located in an upper rear portion of the base body 10. The master cylinder device A1 is mounted in the engine room such that the front side of the base body 10 faces forward, so that one of the first slant edges 302 is formed in the lower front portion of the base body 10. That is, the one of the first slant edges 302 is arranged in the engine room to face toward the space in which structures and peripheral devices M are likely to exist.

The (absent) areas of the second lacking portions 33 are smaller than the (absent) areas of the first lacking portions 32. As illustrated in FIG. 2A, on one side of the base body 10, one of the second lacking portions 33 is located in a upper front portion of the base body 10, and the other of the second lacking portions 33 is located in an lower rear portion of the base body 10. A portion of the screw insertion bore 27 in the boss portion 22a is located in the one of the second lacking portions 33 in the upper front portion in the side view. That is, the screw insertion bore 27 is formed close to the second slant edges 303 (the peripheral wall portion 23) by taking advantage of the one of the second lacking portions 33. It is preferable that the screw insertion bore 27 be centered in the second lacking portion 33 in the upper front portion, and it is more preferable that the entire screw insertion bore 27 be located in the second lacking portion 33.

In addition, as illustrated in FIG. 2A, the entire screw insertion bore 27 in the boss portion 22b is located in the first lacking portion 32 in the lower front portion in the side view.

A plurality of recesses 30b are formed on the peripheral edge of the surface of the lid member 30 to be spaced out in the circumferential direction. Specifically, two recesses 30b are formed on each of the first slant edges 302, and one recess 30b is formed on each of the second slant edges 303. That is, the number of the recesses 30b arranged on the peripheral edge facing the first lacking portions 32 is greater than the number of recesses 30b arranged on the peripheral edge facing the second lacking portions 33. Further, four recesses 30b are arranged on each of the four linear edges 301.

A circumferential groove 30c is formed inside the peripheral edge of the lid member 30 such that the circumferential groove 30c communicates with each of the recesses 30b by groove connection.

As illustrated in FIG. 3, the opening edge 234 of the peripheral wall portion 23 of the housing body 21 has a shape corresponding to the profile of the aforementioned lid member 30, and includes four linear edge portions 231, first slant edges 232, and second slant edges 233. Each of the first slant edges 232 and the second slant edges 233 connects adjacent ones of the linear edge portions 231. The four linear edge portions 231 respectively correspond to the linear edges 301 of the lid member 30, the first slant edges 232 respectively correspond to the linear edges 302, and the second slant edges 233 respectively correspond to the second slant edges 303 of the lid member 30. The opening edge 234 is formed to be a flat face, and a welding portion which is formed on the back surface of the lid member 30 is brought into contact with the opening edge 234 and welded to the opening edge 234. In addition, a circumferential rib 235 is formed on the outer peripheral edge of the opening edge 234.

The peripheral wall portion 23 as above is arranged to stand inside the flange portion 22 in the side view. In addition, the peripheral wall portion 23 has a step portion 23c on the side near the opening 21a, so that the lower portion of the peripheral wall portion 23 is offset inward at the step portion 23c. Thus, even the parts having relatively large diameters, such as coils, can be preferably contained inside the peripheral wall portion 23 on the side near the flange portion 22. In addition, since the lower portion of the peripheral wall portion 23 is offset inward on the side near the opening 21a, it is possible to save space around the lower portion of the peripheral wall portion 23.

As illustrated in FIG. 3, the two connectors 24 and 25 are arranged in parallel in the circumferential direction of the peripheral wall portion 23. Each of the two connectors 24 and 25 has a tubular shape, and is formed integrally with the peripheral wall portion 23 to protrude from the peripheral wall portion 23. Cables (not shown) connected to electromagnetic coils and cables (not shown) connected to the pressure sensors 7 and 8 (illustrated in FIG. 1) are connected to the two connectors 24 and 25.

In the present embodiment, as illustrated in FIG. 3, the two connectors 24 and 25 are arranged such that the center axes X1 and X2 of the two connectors 24 and 25 intersect with one of the linear edge portions 231 of the peripheral wall portion 23. The connector 25, which is arranged on the side near one of the first lacking portions 32 (on the lower side in the vertical direction), protrudes from the peripheral wall portion 23 by an amount smaller than the other connector 24. In addition, the connector 25 is smaller than the connector 24 in the profile viewed from the side on which the cables are connected.

Referring back to FIG. 2A, the reservoir 3 includes the tube connection port 3c and a connection flange (which is not shown) as well as the oil feeding ports 3a and 3b (illustrated in FIG. 1). The tube connection port 3c protrudes from the container body 3e, which reserves the brake fluid. A hose extended from the main reservoir (not shown) is connected to the tube connection port 3c. The connection flange protrudes from the lower surface of the container body 3e. The connection flange is placed on the reservoir mounting portions 13 (as illustrated in FIG. 2B), and fixed to the connection portion of the base body 10 with a spring pin (not shown).

Figure 4:
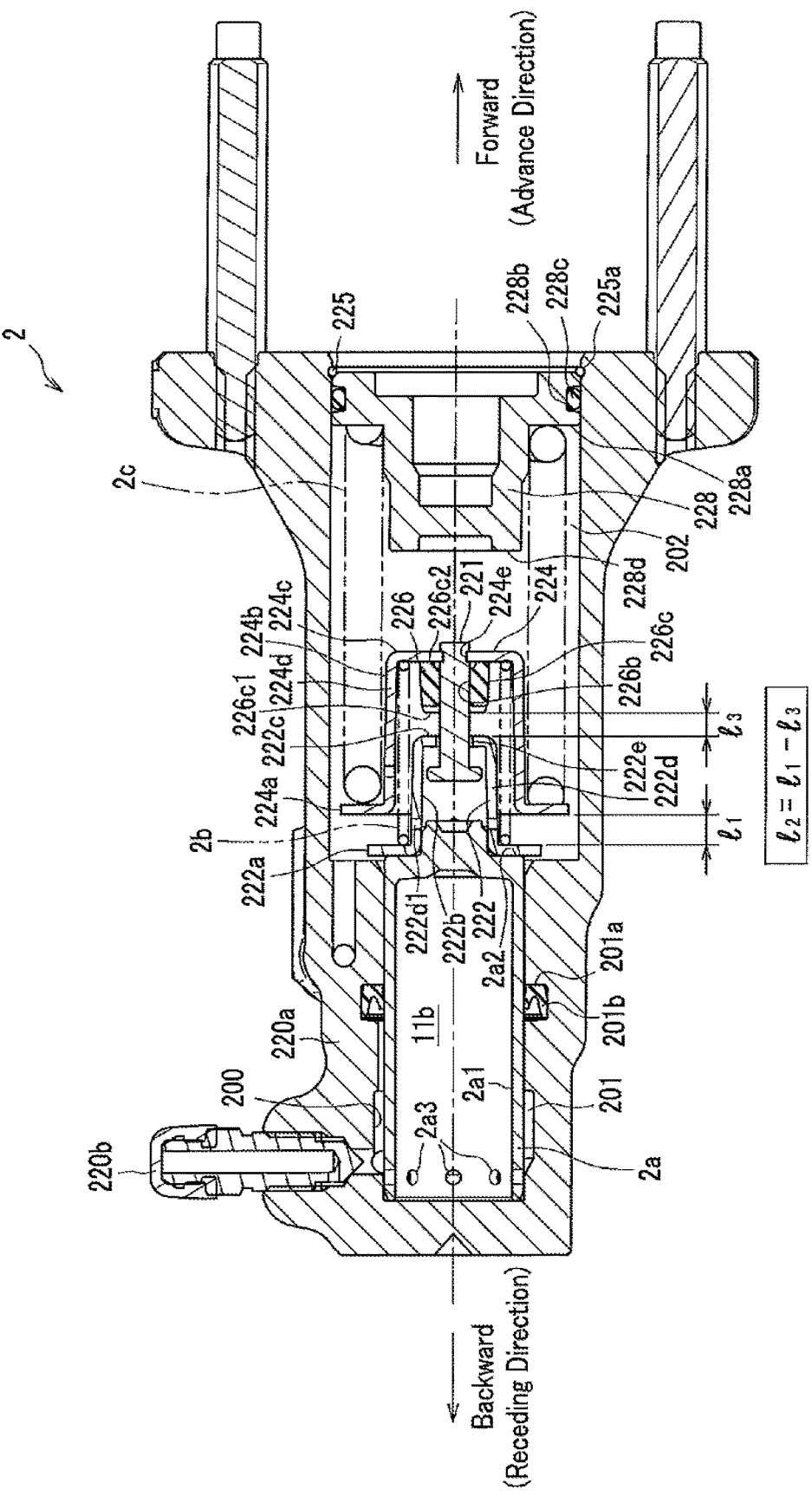
FIG. 4 is a cross-sectional view illustrating a structure of the stroke simulator according to the present embodiment.

In the present embodiment, the stroke simulator 2, which is installed in the master cylinder device A1 (illustrated in FIG. 1) constructed as above, is constructed by assembling components as illustrated in FIG. 4 in a main-body portion 220a, which is formed in the base body 10 (illustrated in FIG. 2A). As illustrated in FIG. 4, the stroke simulator 2 according to the present embodiment includes a liquid conduction port 220b, a cylinder portion 200, the simulator piston 2a, the first return spring 2b, and the second return spring 2c. The liquid conduction port 220b is connected to the normally-closed shutoff valve 6 (illustrated in FIG. 1) through the hydraulic branch path 9e (illustrated in FIG. 1). The second cylinder bore 11b, which has an approximately cylindrical shape, is formed in the cylinder portion 200. The simulator piston 2a can be freely displaced back and forth in the cylinder portion 200. The first return spring 2b has a coil-like shape and a first modulus of elasticity (spring constant) $K_1$, and the second return spring 2c has a coil-like shape and a second modulus of elasticity (spring constant) $K_2$, which is greater than the first modulus of elasticity $K_1$. The second cylinder bore 11b communicates with the hydraulic branch path 9e through the liquid conduction port 220b. When the normally-closed shutoff valve 6, which is normally in a closed state, is switched to the state in which the valve element is in an open position, the brake fluid is inputted into or outputted from the second cylinder bore 11b through the liquid conduction port 220b.

The cylinder portion 200 is constituted by arranging a first cylinder 201 and a second cylinder 202 along a common axis to communicate with each other, where the first cylinder 201 is arranged on the side corresponding to the direction in which the simulator piston 2a recedes (which corresponds to the leftward direction in FIG. 4 and is hereinafter referred to as "rear" or "back"), and the second cylinder 202 is arranged on the side corresponding to the direction in which the simulator piston 2a advances (which corresponds to the rightward direction in FIG. 4 and is hereinafter referred to as "front" or "forward"). In addition, the simulator piston 2a is arranged to be displaced (by sliding) in the back and forth directions in the first cylinder 201. Further, the first cylinder 201 is formed to have an internal diameter smaller than the second cylinder 202. The cylinder portion 200 (the first cylinder 201 and the second cylinder 202) is filled with the brake fluid.

An annular groove 201a is formed in the internal wall of the first cylinder 201. A cup seal 201b, which is formed of, for example, silicone rubber, is fitted into the annular groove 201a, so that the gap formed between the internal wall of the first cylinder 201 and the simulator piston 2a is sealed. Thus, the liquid tightness realized by the cup seal 201b partitions the second cylinder bore 11b into the liquid conduction port 220b side and the second cylinder 202, and prevents leakage, into the front side (the second cylinder 202 side), of the brake fluid flowing into the second cylinder bore 11b through the liquid conduction port 220b. Further, according to the above structure, the hydraulic pressure of the brake fluid flowing from the liquid conduction port 220b can be effectively exerted on the pressing of the simulator piston 2a.

A removed portion 2a1 having an approximately cylindrical shape and being opened toward the backward direction (the receding direction) is formed in the simulator piston 2a. The removed portion 2a1 contributes to lightening of the simulator piston 2a, and has a function of increasing the reserved amount of the brake fluid by increasing the volume of the second cylinder bore 11b. A protrusion is formed on the front end wall 2a2 of the simulator piston 2a. A first spring-sheet member 222 is externally fitted on the protrusion, and is fixed to the protrusion by a connection means such as welding or press fitting.

In addition, a plurality of through-bores 2a3 to the removed portion 2a1 are formed such that the brake fluid taken into the first cylinder 201 from the liquid conduction port 220b flows through the through-bores 2a3 into the removed portion 2a1.

The first spring-sheet member 222 is formed to have a bottomed tubular portion (a cylindrical portion 222d) which is closed on the front side, and has a cuplike shape. The first spring-sheet member 222 is fixed to the simulator piston 2a, with the opening of the cylindrical portion 222d closed with the front end wall 2a2. The first spring-sheet member 222 includes a flange portion 222a, a side wall portion 222b, and a top wall portion 222c. The flange portion 222a has the shape of a planar ring the central portion of which is removed. As shown in FIG. 4, the flange portion 222a is contacted by a shoulder portion of the simulator piston 2a, where the shoulder portion is located at the front end wall 2a2 thereof. The side wall portion 222b stands forward from the inner peripheral edge of the flange portion 222a. The top wall portion 222c covers the top portion of the side wall portion 222b. The top wall portion 222c is spaced away from the flange portion 222a in an axial direction of the cylinder, and the top wall portion 222c is disposed beyond a forwardmost end of the simulator piston 2a in the axial direction, as shown. The front edge side of the flange portion 222a supports the rear edge side of the first return spring 2b.

Further, a through-bore penetrating through the cylindrical portion 222d is indicated by the reference 222d1. The through-bore 222d1 is formed for discharging air or the brake fluid which are accumulated inside the cylindrical portion 222d and disused.

A second spring-seat member 224 having a bottomed tubular portion (a cylindrical portion 224d) is arranged opposed to the first spring-sheet member 222 on the front side of the first spring-sheet member 222. The second spring-seat member 224 is a guide member which arranges the first return spring 2b and the second return spring 2c in series and guides elastic deformation of the first return spring 2b contained inside the second spring-seat member 224. The second spring-seat member 224 includes a flange portion 224a, a side wall portion 224b, and a top wall portion 224c. The flange portion 224a has the shape of a planar ring the central portion of which is removed. The side wall portion 224b stands forward from the inner peripheral edge of the flange portion 224a. The top wall portion 224c covers the top portion of the side wall portion 224b. The front edge side of the flange portion 224a supports the rear edge side of the second return spring 2c. In addition, the bottomed cylindrical portion 224d is formed with the side wall portion 224b and the top wall portion 224c of the second spring-seat member 224, and the first return spring 2b is contained inside the cylindrical portion 224d. That is, the top wall portion 224c realizes the closed end of the cylindrical portion 224d.

The dimensions of the second spring-seat member 224 are greater than the dimensions of the first spring-sheet member 222 as a whole. Specifically, the cylindrical portion 222d of the first spring-sheet member 222 is formed to have an outer diameter smaller than the inner diameter of the cylindrical portion 224d of the second spring-seat member 224 and to be inserted inside the first return spring 2b. In addition, the rear edge side of the top wall portion 224c of the second spring-seat member 224 supports the front edge side of the first return spring 2b.

A bush (a rubber bush 226) formed of, for example, rubber is arranged on the front edge side of the top wall portion 222c of the first spring-sheet member 222. The rubber bush 226 is contained inside the first return spring 2b. Therefore, it is possible to effectively use the limited space, and arrange the rubber bush 226 in parallel with the first return spring 2b. The rubber bush 226 is arranged in the stroke simulator 2 as a bush for the stroke simulator.

As explained above, according to the present embodiment, the first return spring 2b and the second return spring 2c are arranged in series through the second spring-seat member 224, and the first return spring 2b and the rubber bush 226 are arranged in parallel. The first return spring 2b, the second return spring 2c, the rubber bush 226, and the second spring-seat member 224 constitute the reaction-force generation means. The first return spring 2b, the second return spring 2c, and the rubber bush 226 are arranged along the back and forth direction as the axial direction.

A first interval $l_1$ is preset for the distance between the front edge side of the flange portion 222a of the first spring-sheet member 222 and the rear edge side of the flange portion 224a of the second spring-seat member 224. In addition, a third interval $l_3$ is preset for the distance between the top wall portion 222c of the first spring-sheet member 222 and the rear end portion (the first end portion 226c1) of the rubber bush 226 in the situation in which the front end portion (the second end portion 226c2) of the rubber bush 226 is in contact with the top wall portion 224c of the second spring-seat member 224 after movement of the rubber bush 226 to the top wall portion 224c. The first interval $l_1$ is set greater than the third interval $l_3$. Thus, the stroke simulator 2 is configured such that deformation and elastic compression of the rubber bush 226 occur as well as the elastic compression of the first return spring 2b in a second interval $l_2$, which corresponds to the remainder of subtraction of the third interval $l_3$ from the first interval $l_1$. Since the first, second, and third intervals which are preset as above, when the reaction force applied to the simulator piston 2a is switched from the reaction force generated by the first return spring 2b (the first reaction force F1) to the reaction force generated by the second return spring 2c (the second reaction force F2), the rubber bush 226 generates a desirable reaction force (a third reaction force F3) in such a manner that the reaction force applied to the simulator piston 2a is smoothly switched. Details of the structures and operations around the rubber bush 226 are explained later.

According to the above construction, when the driver depresses the brake pedal P (illustrated in FIG. 1), the first spring-sheet member 222 moves (is displaced) relative to the second spring-seat member 224 by a length corresponding to the first interval $l_1$ in the advance direction, and the first return spring 2b is elastically deformed (elastically compressed) by the length corresponding to the first interval $l_1$. That is, the stroke simulator 2 is arranged such that the first return spring 2b is elastically deformed by the length corresponding to the first interval $l_1$ as a predetermined amount.

For example, the first interval $l_1$, the second interval $l_2$, and the third interval $l_3$ may be values which can be appropriately determined to be design values for the stroke simulator 2 on the basis of operation feelings and the like which are required for the vehicle brake system A (illustrated in FIG. 1).

In addition, in the state in which the brake pedal P (illustrated in FIG. 1) is not depressed and the second return spring 2c is elastically compressed from the natural length by $\Delta St2$, the second reaction force F2 corresponding to "the second modulus of elasticity $K_2 \times \Delta St2$ is generated by the second return spring 2c. Further, in the case where the first return spring 2b is in the state in which the first return spring 2b is elastically compressed by $\Delta St1$ from the natural length when the driver depresses the brake pedal P and the manipulation of the brake pedal P by the driver causes the first spring-sheet member 222 to be displaced in the advance direction to the position at which the front edge side of the flange portion 222a of the first spring-sheet member 222 abuts the rear edge side of the flange portion 224a of the second spring-seat member 224, i.e., when the first return spring 2b is elastically deformed (elastically compressed) by the predetermined amount, the first reaction force F1 corresponding to "the first modulus of elasticity $K_1 \times \Delta St1$ is generated by the first return spring 2b. In the case where the first modulus of elasticity $K_1$ is set smaller than the second modulus of elasticity $K_2$, the stroke simulator 2 can be configured such that the first return spring 2b is elastically deformed (elastically compressed) by a predetermined amount precedently and thereafter the second return spring 2c begins to be elastically deformed (elastically compressed).

The rubber bush 226 is elastically compressed in the axial direction with decrease in the gap between the top wall portion 222c of the first spring-sheet member 222 and the top wall portion 224c of the second spring-seat member 224 below the natural length of the rubber bush 226, where the decrease in the gap is caused by depression of the brake pedal P (illustrated in FIG. 1) by the driver. At this time, the third reaction force F3 is generated according to the modulus of elasticity (the third modulus of elasticity $K_3$).

A locking member 228 is arranged on the front side of the second spring-seat member 224 to be opposed to the second spring-seat member 224 and inserted inside the second return spring 2c. The front side of the locking member 228 radially extends to form a flange portion 228a. The flange portion 228a is fitted into and fixed to the second cylinder 202. In addition, an engagement groove 228b is formed around the flange portion 228a. An annular sealing member 228c, which is fitted to the engagement groove 228b, seals between the flange portion 228a and the second cylinder 202. This structure prevents leakage, through between the flange portion 228a and the second cylinder 202, of the brake fluid with which the cylinder portion 200 (the second cylinder 202) is filled. In addition, the rear edge side of the flange portion 228a supports the front edge side of the second return spring 2c.

An annular groove 225a, into which a locking ring 225 is fitted, is formed along the entire inner circumference of the second cylinder 202. The locking member 228 is arranged in such a manner that the front edge side of the flange portion 228a is located on the rear edge side of the annular groove 225a, and the locking ring 225 fitted into the annular groove 225a limits movement of the locking member 228 in the forward direction (in the advance direction). Therefore, it is possible to prevent a fall of the locking member 228 from the second cylinder 202. Further, the locking member 228 is biased forward from the rear edge side of the flange portion 228a by the second return spring 2c, so that the front edge side of the flange portion 228a is pressed against and fixed to the locking ring 225.

Through-bores 222e and 224e are arranged in the central portions of the top wall portions 222c and 224c of the first and second spring-sheet members 222 and 224, respectively. In addition, the rubber bush 226 is substantially formed with a main body portion 226c, which has a tubular shape and includes a hollow 226b penetrating through the rubber bush 226 in the axial direction and having a columnar shape. According to this structure, the hollow 226b functions as a rod insertion bore, through which a rod member 221 is inserted. In addition, the hollow 226b (the rod insertion bore) is formed to have a columnar shape, and the inner circumference of the hollow 226b is even (i.e., straight) in the axial direction. In the present embodiment, the through-bore 224e has a diameter smaller than the through-bore 222e. In addition, the rod member 221 has a stepped shape in which the outer diameter of the rear edge side of the rod member 221 is large within such a range that the rear edge side of the rod member 221 passes through the through-bore 222e and the hollow 226b in the rubber bush 226, and the outer diameter of the front edge side of the rod member 221 is so small that the front edge side of the rod member 221 passes through the through-bore 224e. Further, the outer diameter of the rear edge side of the rod member 221 is increased on the rear edge side of the top wall portion 222c of the first spring-sheet member 222 so that the end portion on the rear edge side of the rod member 221 realizes a stopper for fall prevention. The rod member 221 is installed to extend from the first spring-sheet member 222 to the rubber bush 226, i.e., from the simulator piston 2a to the rubber bush 226. Furthermore, the outer diameter of the end portion of the rod member 221 on the front edge side is increased to be greater than the diameter of the through-bore 224e so that the end portion of the rod member 221 on the front edge side realizes a stopper for fall prevention.

The stopper for fall prevention on the rear edge side of the rod member 221 can be easily formed, for example, by increasing the diameter of the front edge side of the rod member 221 inserted through the through-bore 224e from the rear side, by riveting or the like. The rubber bush 226 is elastically deformed in the axial direction along the rod member 221 which is inserted through the hollow 226b. That is, the rod member 221 has a function of guiding the elastic deformation of the rubber bush 226 in the axial direction. In addition, it is preferable that the portion of the outer circumference of the rod member 221 which is inserted into the rubber bush 226 from the simulator piston 2a and comes into contact with (the inner circumference of) the hollow 226b (as the rod insertion bore) of the rubber bush 226 be formed to be even (i.e., straight) in the axial direction.

The top portion 228d of the locking member 228 is opposed to the top wall portion 224c of the second spring-seat member 224, and realizes a stopper which limits displacement of the simulator piston 2a in the advance direction. The second spring-seat member 224 moves in the advance direction (the forward direction) with displacement of the simulator piston 2a in the advance direction until the top wall portion 224c comes into contact with the top portion 228d of the locking member 228. That is, the stroke simulator 2 is configured such that the simulator piston 2a can be displaced until the top wall portion 224c comes into contact with the top portion 228d of the locking member 228. Therefore, when the top wall portion 224c abuts the top portion 228d of the locking member 228, the simulator piston 2a is maximally displaced in the advance direction.

In addition, a recess which receives the end portion of the rod member 221 protruding from the top wall portion 224c of the second spring-seat member 224 is formed in the top portion 228d. Further, a portion of the front side of the locking member 228 may be removed as needed for lightening.

As described above, the front edge side of the second return spring 2c is supported by abutment on the main-body portion 220a of the stroke simulator 2 through the locking member 228, and the rear edge side of the second return spring 2c is supported by abutment on the flange portion 224a of the second spring-seat member 224. In addition, the front edge side of the first return spring 2b is supported by abutment on the top wall portion 224c inside the cylindrical portion 224d of the second spring-seat member 224, and the rear edge side of the first return spring 2b is supported by abutment on the flange portion 222a of the first spring-sheet member 222. The first spring-sheet member 222 is fixed to the front end wall 2a2. Thus, the simulator piston 2a is biased backward (in the receding direction) by the first and second return springs 2b and 2c.

The first and second return springs 2b and 2c are arranged mechanically in series. The first and second moduli of elasticity $K_1$ and $K_2$ are set such that the gradient of the increase in the reaction force applied to the simulator piston 2a (i.e., the brake reaction force) is small in the beginning of depression of the brake pedal P (illustrated in FIG. 1), and is great in a later stage of the depression. This is based on the design concept that the driver is made unaware of whether a conventional brake system is installed or a by-wire brake system is installed, by equalizing the brake reaction force corresponding to the amount of depression of the brake pedal P with the brake reaction force in the conventional brake system which operates with brake fluid.

Next, the structure of the periphery of the rubber bush 226 according to the present embodiment is explained with reference to FIGS. 5 and 6. The rubber bush 226 has a function of smoothly switching the reaction force applied to the simulator piston 2a (as the brake reaction force applied to the brake pedal P) at the switch point at which the reaction force applied to the simulator piston 2a is switched from the first reaction force F1 to the second reaction force F2. Specifically, the rubber bush 226 is configured to generate the third reaction force F3 which complements the difference between the first reaction force F1 and the second reaction force F2 at the switch point.

Figure 5:
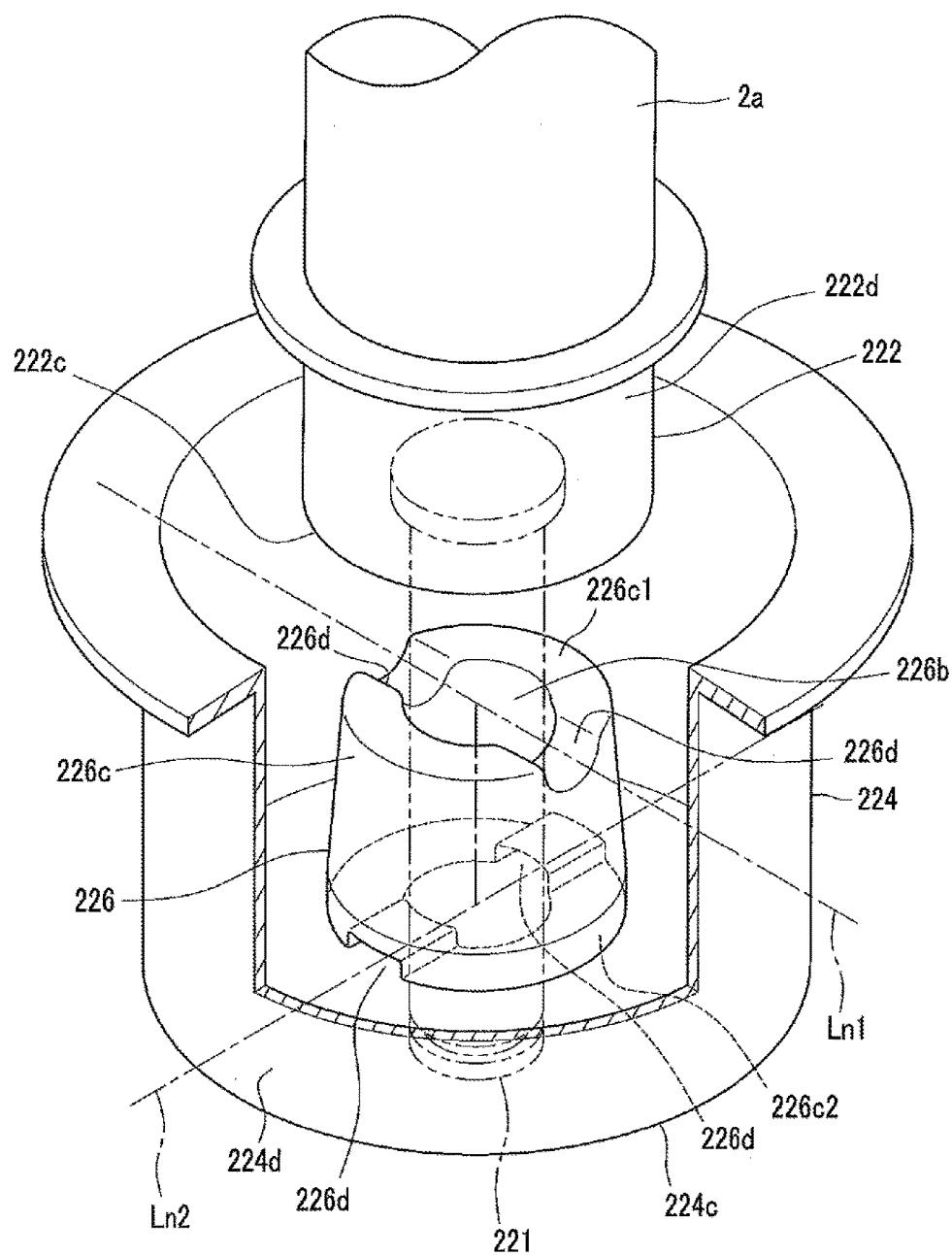
FIG. 5 is a perspective view illustrating the shape of a rubber bush.

As illustrated in FIG. 5, the rubber bush 226 is substantially formed with the main body portion 226c having the hollow 226b, which penetrates through the center of the main body portion 226c in the axial direction. The rubber bush 226 is an elastic member formed of a raw material having elasticity such as synthetic resin (synthetic rubber) or natural rubber. The rubber bush 226 has the third modulus of elasticity $K_3$, which is (variable) in a range below the second reaction force F2. In addition, the rubber bush 226 is arranged mechanically in parallel with the first return spring 2b (illustrated in FIG. 4). Specifically, the rubber bush 226 is arranged inside the first return spring 2b in the same axial direction as the first return spring 2b as illustrated in FIG. 4.

Further, the setting of the third modulus of elasticity $K_3$ in the range below the second modulus of elasticity $K_2$ enables the elastic deformation of the rubber bush 226 to begin earlier than the elastic deformation of the second return spring 2c. Therefore, it is possible to apply the third reaction force F3 of the rubber bush 226 as a reaction force to the simulator piston 2a by causing the elastic deformation of the rubber bush 226 earlier than the elastic deformation of the second return spring 2c in a vicinity of the switch point at which the reaction force applied to the simulator piston 2a is switched from the first reaction force F1 to the second reaction force F2. In addition, the reaction force can be applied to the simulator piston 2a at the switch point by complementing, with the third reaction force F3, the difference between the first reaction force F1 and the third reaction force F3. Alternatively, the third modulus of elasticity $K_3$ may be set in a range below the first modulus of elasticity $K_1$.

Further, since the elastic member generating the third reaction force F3 is realized by the rubber bush 226 instead of a spring, the third reaction force F3 can be made nonlinear. That is, the elastic deformation of the rubber bush 226 has an effect of increasing the friction force between the inner circumferential wall of the hollow 226b and the outer circumferential wall of the rod member 221. The causes of the above increase in the friction force include the fact that expansion of the outer circumferential wall of the rubber bush 226 is limited by the inner diameter of the first return spring 2b.

In the case where the rubber bush 226 is elastically compressed by being pressed by the simulator piston 2a, the main body portion 226c is deformed to expand outward. However, the outward expansion of the rubber bush 226 contained inside the first return spring 2b (illustrated in FIG. 4) is limited by the first return spring 2b. Therefore, the rubber bush 226, which is elastically compressed by being pressed by the simulator piston 2a, is compressed toward the hollow 226b side, so that the friction force between the rod member 221 and the rubber bush 226 increases. Since the friction force increases as above, the third reaction force F3 generated by the elastically compression of the rubber bush 226 becomes nonlinear.

Figure 6A:
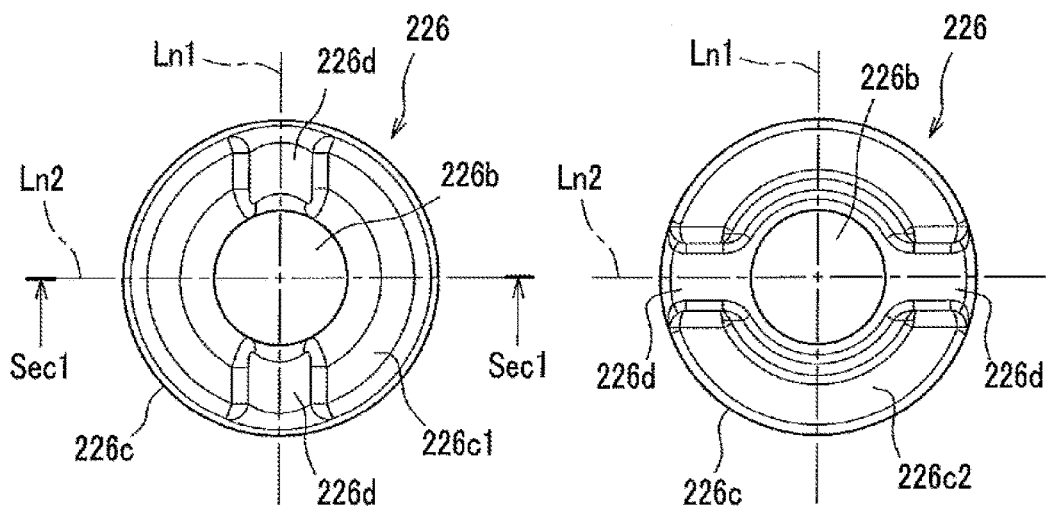
FIG. 6A is a plan view of the rubber bush from the side of first and second end portions.
Figure 6B:
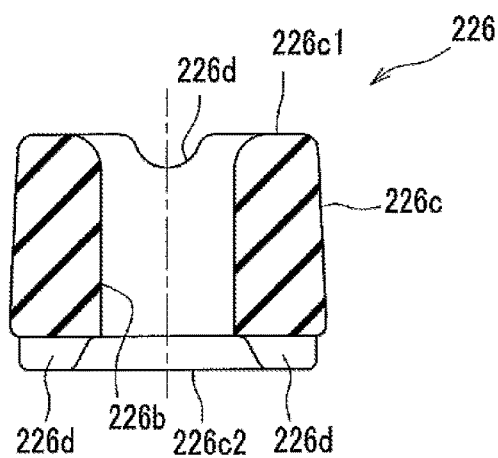
FIG. 6B is a cross-sectional view of the rubber bush at the cross section Sec1.

As illustrated in FIGS. 5 and 6, the rubber bush 226 according to the present embodiment is formed to have the main body portion 226c, which has an approximately cylindrical shape and through which the hollow 226b penetrates in the axial direction of the rod member 221. The rubber bush 226 is installed between (the top wall portion 222c of) the first spring-sheet member 222 and (the top wall portion 224c of) the second spring-seat member 224 after the rod member 221 is inserted through the rubber bush 226. Hereinafter, the axial direction of the rod member 221 is assumed to be identical to the axial direction of the rubber bush 226.

The rod member 221 penetrates through the hollow 226b of the rubber bush 226 from the through-bore 222e side, and further penetrates through the through-bore 224e, where the through-bore 222e (illustrated in FIG. 4) is formed in the top wall portion 222c of the first spring-sheet member 222, and the through-bore 224e (illustrated in FIG. 4) is formed in the top wall portion 224c of the second spring-seat member 224. As explained before, the stopper for prevention of a fall of the rod member 221 on the first spring-sheet member 222 side is formed by increasing the diameter of the end portion of the rod member 221 on the first spring-sheet member 222 side such that the diameter-increased end portion does not pass through the through-bore 222e. In addition, the stopper for prevention of a fall of the rod member 221 on the second spring-seat member 224 side is formed by increasing the diameter of the end portion of the rod member 221 on the second spring-seat member 224 side by riveting or the like. Further, although the first return spring 2b (illustrated in FIG. 4) is contained inside the cylindrical portion 224d of the second spring-seat member 224, the first return spring 2b is not shown in FIG. 5.

As the driver depresses the brake pedal P (illustrated in FIG. 1), the first return spring 2b (illustrated in FIG. 4) moves into the cylindrical portion 224d of the second spring-seat member 224. When the gap between the top wall portion 222c of the first spring-sheet member 222 and the top wall portion 224c of the second spring-seat member 224 becomes smaller than the natural length of the rubber bush 226 in the axial direction, the rubber bush 226 is elastically compressed in the axial direction. At this time, the first end portion 226c1 as one end portion of the rubber bush 226 on the first spring-sheet member 222 side, i.e., on the simulator piston 2a side, is pressed by the top wall portion 222c, and the second end portion 226c2 as the other end portion of the rubber bush 226 on the second spring-seat member 224 side is pressed by the top wall portion 224c.

In addition, as illustrated in FIGS. 5 and 6, a plurality of recesses 226d, which are recessed in the axial direction, are formed on the first end portion 226c1. Preferably, the recesses 226d are arranged equally spaced out around the hollow 226b. Two recesses 226d arranged along a straight line (the first straight line Ln1) perpendicular to the axial direction are illustrated in FIG. 5 and FIG. 6A.

The portions of the first end portion 226c1 between the recesses 226d come into contact with and are pressed by the top wall portion 222c of the first spring-sheet member 222, so that the portions of the first end portion 226c1 are elastically compressed. Since the recesses 226d are formed on the first end portion 226c1, the contact area with the top wall portion 222c becomes smaller, and the rubber bush 226 has a shape which is easy to be elastically compressed. Further, the modulus of elasticity of the rubber bush 226 (i.e., the third modulus of elasticity $K_3$) can be set as needed, by appropriately determining the number and the shapes of the recesses 226d. In addition, in the rubber bush 226 according to the present embodiment, the main body portion 226c has a tapered shape, which is tapered toward the axial direction, and the first end portion 226c1 is formed to have an outer diameter slightly smaller than the second end portion 226c2. In connection to this, the recesses 226d on the first end portion 226c1 are formed to have a volume slightly smaller than a plurality of recesses 226d on the second end portion 226c2. This structure enables the first end portion 226c1 and the second end portion 226c2 to generate an even reaction force (the third reaction force F3).

Although the recesses 226d in FIG. 5 have groove-like shapes extending in radial directions from the hollow 226b toward the outside of the main body portion 226c, alternatively, the recesses 226d may have other shapes. For example, the first end portion 226c1 and the second end portion 226c2 may have round-shaped recesses (not shown).

In addition, as illustrated in FIGS. 5 and 6, the plurality of recesses 226d, which are recessed in the axial direction, are also formed on the second end portion 226c2. Preferably, the recesses 226d on the second end portion 226c2 are also arranged equally spaced out around the hollow 226b. Further, preferably, the number of the recesses 226d formed on the second end portion 226c2 is equal to the number of the recesses 226d formed on the first end portion 226c1, and the recesses 226d on the second end portion 226c2 are arranged in positions different in the axial direction from the recesses 226d on the first end portion 226c1.

Preferably, the recesses 226d on the first end portion 226c1 and the second end portion 226c2 are arranged such that when all of the recesses 226d on the first end portion 226c1 and the second end portion 226c2 are projected onto a virtual plane having a normal in the axial direction of the rubber bush 226, the projected images of the recesses 226d on the first end portion 226c1 are shifted from the projected images of the recesses 226d on the second end portion 226c2 in the circumferential direction. (That is, it is preferable that the recesses 226d on the second end portion 226c2 be arranged in positions different in the axial direction from the recesses 226d on the first end portion 226c1.)

In the above structure, the recesses 226d on the second end portion 226c2 are formed in positions different in the axial direction of the rubber bush 226 from the recesses 226d on the first end portion 226c1.

When the rubber bush 226 is elastically compressed, stress concentration occurs in the portions on which the recesses 226d are formed, so that the portions on which the recesses 226d are formed are weak compared with the other portions. Therefore, if the recesses 226d on the first end portion 226c1 are formed in the same positions in the circumferential direction (the same positions in the axial direction) as the recesses 226d on the second end portion 226c2, the weak portions in the first end portion 226c1 become the same positions in the axial direction as the weak portions in the second end portion 226c2. That is, the strength of the portions on which the recesses 226d are formed is lowered compared with the other portions.

However, in the structure in which the recesses 226d on the first end portion 226c1 are formed in different positions in the axial direction from the recesses 226d on the second end portion 226c2, the weak portions in the first end portion 226c1 are located in different positions in the axial direction from the second end portion 226c2. That is, the weak portions are dispersed, so that lowering of the strength can be suppressed, and the rigidity of the rubber bush 226 is increased.

Two recesses 226d arranged along a straight line (the second straight line Ln2) perpendicular to the axial direction on the second end portion 226c2 are illustrated in FIG. 5 and FIG. 6A. Preferably, the second straight line Ln2 be a straight line perpendicular to the first straight line Ln1, on which the two recesses 226d are arranged on the first end portion 226c1.

That is, in the above structure, the recesses 226d on the second end portion 226c2 are formed in the positions which are rotated by 90 degrees in the circumferential direction around the hollow 226b from the positions of the recesses 226d on the first end portion 226c1, i.e., the recesses 226d on the second end portion 226c2 are arranged in the positions different in the circumferential direction (different in the axial direction) from the recesses 226d on the first end portion 226c1.

As explained above, preferably, the number of the recesses 226d formed on the second end portion 226c2 is equal to the number of the recesses 226d formed on the first end portion 226c1, and the recesses 226d formed on the second end portion 226c2 are arranged in positions different in the circumferential direction (in the axial direction) from the recesses 226d formed on the first end portion 226c1.

According to the above structure, it is possible to reduce the difference between the shapes of the first end portion 226c1 and the second end portion 226c2, and equalize the strength of the third reaction force F3 generated when one end of the rubber bush 226 in the axial direction is used as the first end portion 226c1 (or the second end portion 226c2)

and the strength of the third reaction force F3 generated when the other end of the rubber bush 226 in the axial direction is used as the first end portion 226c1 (or the second end portion 226c2).

Thus, in the operation for installing the rubber bush 226 in the process for manufacturing the stroke simulator 2 (illustrated in FIG. 4), the worker can install the rubber bush 226 without distinguishing the first edge 226c1 and the second edge 226c2. That is, it is unnecessary to control the installation direction of the rubber bush 226 in the process for manufacturing the stroke simulator 2, so that the work efficiency can be increased. In addition, since products are not determined to be defective on the ground that the rubber bush 226 is installed in a wrong orientation, lowering of the yield rate of the stroke simulator 2 can be avoided.

Figure 7:
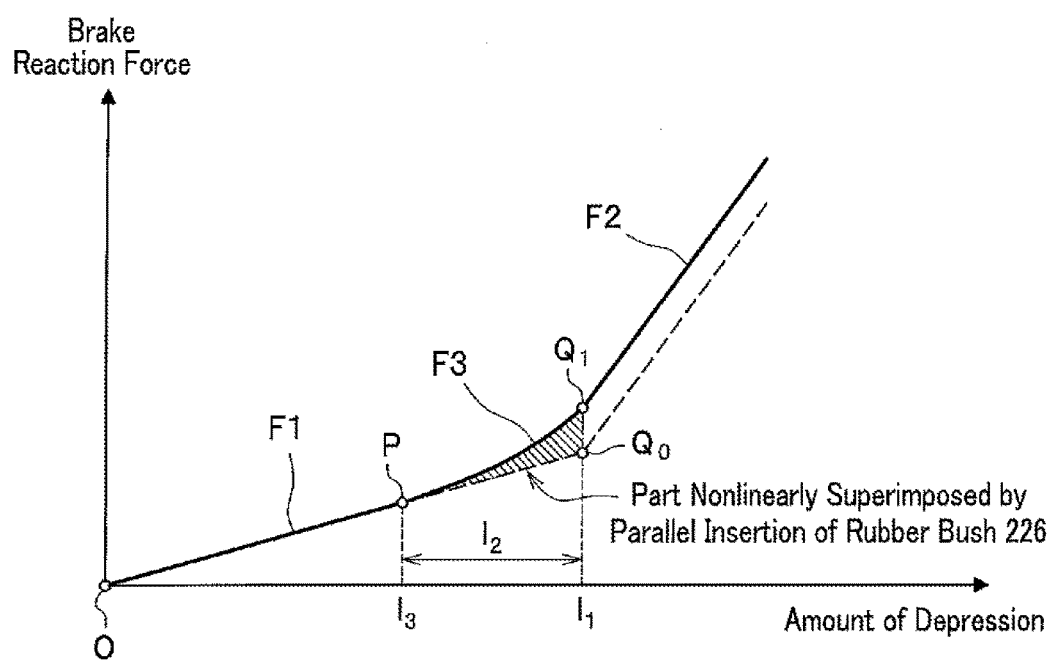
FIG. 7 is a graph indicating a relationship between the brake reaction force and the amount of depression, and is a diagram illustrating the operation of the rubber bush.

FIG. 7 is a diagram illustrating the operation of the rubber bush, and a graph indicating a relationship between the brake reaction force and the amount of depression of the brake pedal.

First, when the brake pedal P (illustrated in FIG. 1) is depressed, the master cylinder 1 generates a hydraulic pressure, and the hydraulic pressure is transmitted to the simulator piston 2a (illustrated in FIG. 4) in the cylinder portion 200 (illustrated in FIG. 4). Then, the simulator piston 2a is displaced in the advance direction (in the forward direction) in the cylinder portion 200. The displacement of the simulator piston 2a causes the first return spring 2b to be elastically compressed earlier and generate the first reaction force F1, where the second return spring 2c has a great modulus of elasticity, and the first return spring 2b has a small modulus of elasticity compared with the second return spring 2c. The interval of the above operation (the interval from the point O to the point $Q_0$ indicated in FIG. 7) is the first interval $l_1$. When the brake pedal P is further depressed, the second return spring 2c (illustrated in FIG. 4) is elastically compressed to generate the second reaction force F2, from the point $Q_0$ as indicated in FIG. 7 by the dashed line.

That is, when the displacement of the simulator piston 2a (illustrated in FIG. 4) in the advance direction causes the first spring-sheet member 222 (illustrated in FIG. 4) to move forward, finally the front edge wall 222a1 of the flange portion 222a of the first spring-sheet member 222 (illustrated in FIG. 4) comes into contact with the rear edge wall 224a1 of the flange portion 224a of the second spring-seat member 224 (illustrated in FIG. 4). In other words, the interval from the start of the forward movement of the first spring-sheet member 222 to the abutment of the first spring-sheet member 222 on the second spring-seat member 224 corresponds to the first interval $l_1$.

In the present embodiment in which the rubber bush 226 (illustrated in FIG. 4) is arranged in parallel with the first return spring 2b (illustrated in FIG. 4), the first interval $l_1$ can be divided into the second interval $l_2$ and the third interval $l_3$. The second interval $l_2$ is the interval after the start of the elastic deformation (elastic compression) of the rubber bush 226 accompanied by the displacement of the simulator piston 2a (illustrated in FIG. 4) in the advance direction, and the third interval $l_3$ is the interval from the start of the forward movement of the first spring-sheet member 222 (illustrated in FIG. 4) until the start of the elastic deformation (elastic compression) of the rubber bush 226.

In other words, the start point of the second interval $l_2$ is a halfway point of the first interval $l_1$ (the point P in FIG. 7: the time at which the elastic compression of the rubber bush 226 accompanied by the displacement of the simulator piston 2a (illustrated in FIG. 4) in the advance direction starts), and the end point of the first interval $l_1$ is the switch point in the first interval $l_1$ (the point $Q_0$ in FIG. 7: the switch point at which the reaction force applied to the simulator piston 2a is switched from the first reaction force F1 generated by the first return spring 2b to the second reaction force F2 generated by the second return spring 2c). Therefore, in the second interval $l_2$ beginning from the halfway point (the point P in FIG. 7) in the first interval $l_1$ to the switch point (the point $Q_0$ in FIG. 7), the elastic compression of the rubber bush 226 proceeds in parallel with the elastic compression of the first return spring 2b (illustrated in FIG. 4), where the rubber bush 226 generates the third reaction force F3.

In the second interval $l_2$, the brake reaction force corresponding to the amount of depression of the brake pedal P (illustrated in FIG. 1) is generated by superimposition of the first reaction force F1 and the third reaction force F3 as indicated by the solid curve, where the first reaction force F1 is generated to be linear by elastic compression of the first return spring 2b (illustrated in FIG. 4), and the third reaction force F3 is generated to be nonlinear by elastic compression of the rubber bush 226 (illustrated in FIG. 4). Therefore, the brake reaction force applied to the brake pedal P in the second interval $l_2$ (the interval from the point P to the point $Q_1$ in FIG. 7) is corrected so as to smoothly connect the first reaction force F1 (which is generated to be linear by the first return spring 2b) and the second reaction force F2 (which is generated to be linear by the second return spring 2c). Specifically, the first reaction force F1 is corrected such that the difference between the first reaction force F1 and the second reaction force F2 is complemented with the third reaction force F3 at the switch point (the point $Q_1$ in FIG. 7). This correction (complementing) is realized by addition for superimposing the linear first reaction force F1 generated by the elastic compression of the first return spring 2b and the nonlinear third reaction force F3 obtained by parallel insertion of the rubber bush 226, as indicated in FIG. 7.

Therefore, in the vehicle brake system A (illustrated in FIG. 1) which is provided with the rubber bush 226 (illustrated in FIG. 4), it is possible to smoothly switch the reaction force applied to the simulator piston 2a for the brake reaction force applied to the brake pedal P, from the first reaction force F1 generated by the first return spring 2b having the first modulus of elasticity $K_1$ to the second reaction force F2 generated by the second return spring 2c having the second modulus of elasticity $K_2$, at the switch point from the first reaction force F1 to the second reaction force F2. Thus, the sense of incongruity which the driver feels can be greatly reduced.

Figure 8A:
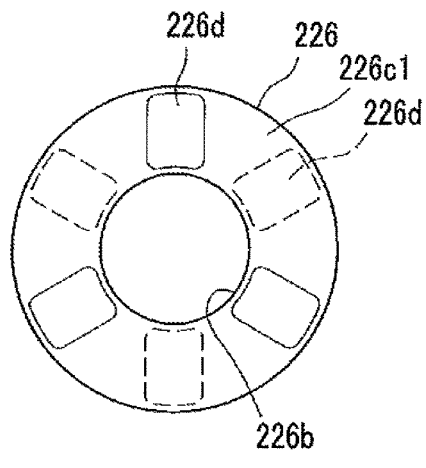
FIG. 8A is a diagram illustrating a rubber bush in which three recesses are formed in the first and second end portions.
Figure 8B:
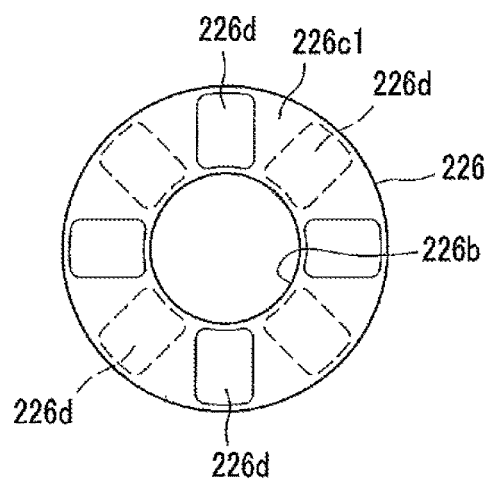
FIG. 8B is a diagram illustrating a rubber bush in which four recesses are formed in the first and second end portions.

Incidentally, the shape of the rubber bush 226 (illustrated in FIG. 5) is not limited to the shape in which the two recesses 226d are formed on each of the first end portion 226c1 (illustrated in FIG. 5) and the second end portion 226c2 (illustrated in FIG. 5). For example, the rubber bush 226 may have a shape in which three recesses 226d are formed on each of the first end portion 226c1 and the second end portion 226c2 as illustrated in FIG. 8A. Alternatively, the rubber bush 226 may have a shape in which four recesses 226d are formed on each of the first end portion 226c1 and the second end portion 226c2 as illustrated in FIG. 8B. Further alternatively, although not shown, the rubber bush 226 may have a shape in which five or more recesses 226d are formed on each of the first end portion 226c1 and the second end portion 226c2. The number, shape, and dimensions of the recesses 226d formed on the first end portion 226c1 and the second end portion 226c2 of the rubber bush 226 may be appropriately determined to generate the third reaction force F3 which can complement the difference between the first reaction force F1 and the second reaction force F2 at the switch point.

Further, whichever shape the rubber bush 226 has, it is preferable that the recesses 226d (illustrated in FIG. 5) be arranged equally spaced out around the hollow 226b (illustrated in FIG. 5), and the recesses 226d on the first end portion 226c1 be formed positions different in the axial direction from the recesses 226d on the second end portion 226c2 (illustrated in FIG. 5).

For example, in the case where three recesses 226d are formed on the second end portion 226c2 as illustrated in FIG. 8A, the intervals between the recesses 226d formed equally spaced out around the hollow 226b are 120 degrees. In this case, it is preferable that the recesses 226d on the first end portion 226c1 (illustrated in FIG. 5) be formed on the positions rotated by 60 degrees from the positions of the recesses 226d on the second end portion 226c2. In this structure, the number of the recesses 226d formed on the second end portion 226c2 is equal to the number of the recesses 226d formed on the first end portion 226c1, and the recesses 226d formed on the second end portion 226c2 are arranged in positions different in the axial direction from the recesses 226d formed on the first end portion 226c1.

Similarly, in the case where four recesses 226d are formed on the second end portion 226c2 as illustrated in FIG. 8B, the intervals between the recesses 226d formed equally spaced out around the hollow 226b are 90 degrees. In this case, it is preferable that the recesses 226d on the first end portion 226c1 (illustrated in FIG. 5) be formed on the positions rotated by 45 degrees from the positions of the recesses 226d on the second end portion 226c2. In this structure, the number of the recesses 226d formed on the second end portion 226c2 is equal to the number of the recesses 226d formed on the first end portion 226c1, and the recesses 226d formed on the second end portion 226c2 are arranged in positions different in the axial direction from the recesses 226d formed on the first end portion 226c1.

In summary, in the case where N recesses 226d (where N is a natural number equal to or greater than two) are formed on the second end portion 226c2, the intervals between the recesses 226d formed equally spaced out around the hollow 226b are 360/N degrees. In this case, it is preferable that the recesses 226d on the first end portion 226c1 (illustrated in FIG. 5) be formed on the positions rotated by 180/N degrees from the positions of the recesses 226d on the second end portion 226c2. In this structure, the number of the recesses 226d formed on the second end portion 226c2 is equal to the number of the recesses 226d formed on the first end portion 226c1, and the recesses 226d formed on the second end portion 226c2 are arranged in positions different in the axial direction from the recesses 226d formed on the first end portion 226c1.

Figure 8C:
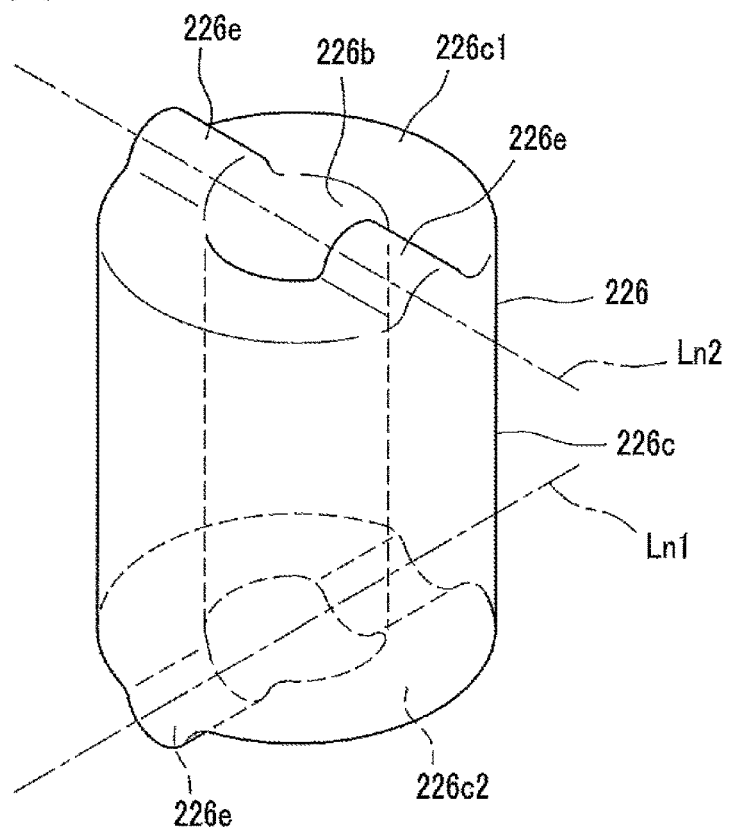
FIG. 8C is a perspective view illustrating a rubber bush in which two protrusions are formed in the first and second end portions.

Alternatively, the rubber bush 226 may have a structure in which protrusions 226e protruding in the axial direction, instead of the recesses 226d, are formed on each of the first end portion 226c1 and the second end portion 226c2 as illustrated in FIG. 8C. In this structure, the protrusions 226e formed on the first end portion 226c1 comes into contact with the front edge side of the top wall portion 222c of the first spring-sheet member 222 (illustrated in FIG. 5), and the protrusions 226e formed on the second end portion 226c2 comes into contact with the front edge side of the top wall portion 224c of the second spring-seat member 224 (illustrated in FIG. 5). In the above case, the third modulus of elasticity $K_3$ of the rubber bush 226 can be set as needed by appropriately determining the shape of the protrusions 226e.

Then, the rubber bush 226 is elastically deformed (elastically compressed) with displacement of the simulator piston 2a to generate the third reaction force F3. In the elastic compression of the rubber bush 226, the protrusions 226e are pressed and squashed by the top wall portions 222c and 224c.

In the case where the protrusions 226e are formed on the first end portion 226c1 and the second end portion 226c2, it is also preferable that the protrusions 226e (illustrated in FIG. 5) be arranged equally spaced out around the hollow 226b, and the protrusions 226e on the first end portion 226c1 be formed positions different in the axial direction from the protrusions 226e on the second end portion 226c2.

For example, FIG. 8C illustrates the protrusions 226e which have a ridge shape and extend in radial directions from the hollow 226b toward the outer circumference of the main body portion 226c.

In FIG. 8C, two protrusions 226e are formed on each of the first end portion 226c1 and the second end portion 226c2 along a straight line (the first straight line Ln1 or the second straight line Ln2) perpendicular to the axial direction, and the first straight line Ln1 along which the two protrusions 226e on the first end portion 226c1 are formed is perpendicular to the second straight line Ln2 along which the two protrusions 226e on the second end portion 226c2 are formed. That is, the two protrusions 226e on the first end portion 226c1 are formed in positions different in the axial direction from the two protrusions 226e on the second end portion 226c2.

In the case where three or more protrusions 226e are formed on the first end portion 226c1, similarly to the case where the recesses 226d are formed, preferably, the number of the protrusions 226e formed on the second end portion 226c2 is equal to the number of the protrusions 226e formed on the first end portion 226c1, and the protrusions 226e formed on the second end portion 226c2 are arranged in positions different in the axial direction from the protrusions 226e formed on the first end portion 226c1.

Incidentally, the shapes of the protrusions 226e are not specifically limited. For example, the protrusions 226e may have knob-like or boss-like shapes (not shown) formed on the first end portion 226c1 and the second end portion 226c2.

LIST OF REFERENCES

1: Master Cylinder (Hydraulic-pressure Generation Means)
2: Stroke Simulator
2a: Simulator Piston
2b: First Return Spring (Reaction-force Generation Means)
2c: Second Return Spring (Reaction-force Generation Means)
200: Cylinder Portion
201: First Cylinder
202: Second Cylinder
221: Rod Member
224: Second Spring-seat Member (Reaction-force Generation Means)
226: Rubber Bush (Bush, Reaction-force Generation Means, and Bush for Stroke Simulator)
226b: Hollow 226c1: First Edge Portion
226c2: Second Edge Portion
226d: Recesses
226e: Protrusions
Ln1: First Straight Line
Ln2: Second Straight Line
P: Brake Pedal (Brake Manipulator)

The invention claimed is:

1. A stroke simulator comprising:
a hollow cylinder,
a simulator piston which is configured to be displaced in the cylinder by a hydraulic pressure generated by a hydraulic-pressure generator according to a manipulation of a brake manipulator by a driver, and
a reaction-force generator for generating a reaction force corresponding to displacement of the simulator piston; and for applying the reaction force to the simulator piston, as a brake reaction force to be applied to the brake manipulator;
wherein:
the reaction-force generator comprises a spring sheet member having a flange which is contacted by a shoulder portion of the simulator piston, the spring sheet member further having a top wall portion spaced away from the flange in an axial direction of the cylinder, the top wall portion disposed beyond a forwardmost end of the simulator piston in the axial direction, and a bush which has a cylindrical shape and is configured to be elastically deformed in the axial direction by being pressed by the top wall portion of the spring sheet member in response to displacement of the simulator piston;
two recesses or protrusions are formed on each of a first end portion and a second end portion of the bush, where the recesses are recessed and the protrusions protrude in the axial direction, the first end portion is at one end of the bush, and the second end portion is at another end of the bush;
the recesses or protrusions on the first end portion are formed in positions of the bush which are different in the axial direction from positions of the recesses or protrusions on the second end portion; and
wherein the two recesses or protrusions on the first end portion are formed along a first straight line perpendicular to the axial direction, and the two recesses or protrusions on the second end portion are formed along a second straight line perpendicular to the axial direction and to the first straight line.

2. The stroke simulator according to claim 1, wherein a hollow having a columnar shape is formed in the bush to penetrate through the bush in the axial direction, and the recesses or protrusions are formed equally spaced out around the hollow on each of the first end portion and the second end portion.

3. The stroke simulator according to claim 1, wherein a rod member which extends from the simulator piston toward the bush and guides elastic deformation of the bush in the axial direction is arranged through a rod insertion bore formed in the bush, and a portion, inserted from the simulator piston into the bush, of an outer circumference of the rod member which is in contact with an inner circumference of the rod insertion bore is even in the axial direction.

4. The stroke simulator according to claim 2, wherein the recesses or protrusions on each of the first end portion and the second end portion are formed in the number of two, the two recesses or protrusions on the first end portion are formed along a first straight line perpendicular to the axial direction, and the two recesses or protrusions on the second end portion are formed along a second straight line perpendicular to the axial direction and the first straight line.

5. The stroke simulator according to claim 2, wherein a rod member which extends from the simulator piston toward the bush and guides elastic deformation of the bush in the axial direction is arranged through a rod insertion bore formed in the bush, and a portion, inserted from the simulator piston into the bush, of an outer circumference of the rod member which is in contact with an inner circumference of the rod insertion bore is even in the axial direction.

6. The stroke simulator according to claim 1, wherein a rod member which extends from the simulator piston toward the bush and guides elastic deformation of the bush in the axial direction is arranged through a rod insertion bore formed in the bush, and a portion, inserted from the simulator piston into the bush, of an outer circumference of the rod member which is in contact with an inner circumference of the rod insertion bore is even in the axial direction.

7. A bush for a stroke simulator, provided in a stroke simulator for generating, as a brake reaction force to be applied to a brake manipulator, a reaction force applied to a simulator piston which is displaced in a cylinder with a hydraulic pressure generated by a hydraulic-pressure generator according to a manipulation of the brake manipulator by a driver, the bush being arranged in a reaction-force generator which applies to the simulator piston a reaction force corresponding to displacement of the simulator piston;
the stroke simulator comprising a hollow cylinder, said simulator piston and said reaction-force generator disposed inside of said hollow cylinder;
wherein:
the reaction-force generator comprises a spring sheet member having a flange which is contacted by a shoulder portion of the simulator piston, the spring sheet member further having a top wall portion spaced away from the flange in an axial direction of the cylinder, the top wall portion disposed beyond a forwardmost end of the simulator piston in the axial direction;
the bush has a cylindrical shape and is configured to be elastically deformed in an axial direction by being pressed by the top wall portion of the spring sheet member in response to displacement of the simulator piston; and
the bush has two recesses or protrusions formed on each of a first end portion and a second end portion thereof, the recesses are recessed and the protrusions protrude in the axial direction, the first end portion is at one end of the bush, the second end portion is at another end of the bush, and the recesses or protrusions on the first end portion are formed in positions of the bush which are different in the axial direction from positions of the recesses or protrusions on the second end portion,
wherein the two recesses or protrusions on the first end portion are formed along a first straight line perpendicular to the axial direction, and the two recesses or protrusions on the second end portion are formed along a second straight line perpendicular to the axial direction and to the first straight line.

8. The bush for a stroke simulator according to claim 7, wherein a hollow having a columnar shape is formed in the bush to penetrate through the bush in the axial direction, and the recesses or protrusions are formed equally spaced out around the hollow on each of the first end portion and the second end portion.

9. The bush for a stroke simulator according to claim 8, wherein the recesses or protrusions on each of the first end portion and the second end portion are formed in the number of two, the two recesses or protrusions on the first end portion are formed along a first straight line perpendicular to the axial direction, and the two recesses or protrusions on the second end portion are formed along a second straight line perpendicular to the axial direction and the first straight line.

10. A stroke simulator including:
a main body portion having a first cylindrical bore and a second cylindrical bore formed therein, the second cylindrical bore having a larger diameter than the first cylindrical bore;
a simulator piston which is configured to be displaced in the first cylindrical bore with a hydraulic pressure generated by a hydraulic-pressure generator according to a manipulation of a brake manipulator by a driver, the simulator piston having a front end wall with a protrusion formed thereon,
a cup-shaped first spring-sheet member which is externally fitted on the protrusion of the simulator piston, and
a reaction-force generator which generates a reaction force corresponding to displacement of the simulator piston, and which applies the reaction force to the simulator piston, as a brake reaction force to be applied to the brake manipulator;
wherein the reaction-force generator comprises:
a cup-shaped second spring-sheet member which nestingly receives a portion of the first spring-sheet member therein;
a rod member which interconnects the first and second spring-sheet members;
a cylindrical first return spring which fits inside of the second spring-sheet member and which surrounds an outer portion of the first spring-sheet member;
a bush which fits inside of the second spring-sheet member and which receives a portion of the rod therethrough, the bush having a cylindrical shape and configured to be elastically deformed in an axial direction by being pressed by displacement of the simulator piston;
a plurality of recesses or protrusions are formed on each of a first end portion and a second end portion of the bush, where the recesses are recessed and the protrusions extend outwardly in the axial direction,
the first end portion is at one end of the bush, and the second end portion is at another end of the bush; and
the recesses or protrusions on the first end portion are formed in positions of the bush which are different in the axial direction from positions of the recesses or protrusions on the second end portion.

11. The stroke simulator according to claim 10, wherein a hollow having a columnar shape is formed in the bush to penetrate through the bush in the axial direction, and the recesses or protrusions are formed equally spaced out around the hollow on each of the first end portion and the second end portion.

12. The stroke simulator according to claim 10, wherein two recesses or protrusions are provided on each of the first end portion and the second end portion, the two recesses or protrusions on the first end portion are formed along a first straight line perpendicular to the axial direction, and the two recesses or protrusions on the second end portion are formed along a second straight line perpendicular to the axial direction and the first straight line.

13. The stroke simulator according to claim 10, wherein a rod member which extends from the simulator piston toward the bush and guides elastic deformation of the bush in the axial direction is arranged through a rod insertion bore formed in the bush, and a portion, inserted from the simulator piston into the bush, of an outer circumference of the rod member which is in contact with an inner circumference of the rod insertion bore is even in the axial direction.

* * * * *